(12) United States Patent
Stewart et al.

(10) Patent No.: US 7,423,532 B2
(45) Date of Patent: Sep. 9, 2008

(54) DETERMINATION OF WHEEL SENSOR POSITION USING A SINGLE RADIO FREQUENCY DETECTOR IN AN AUTOMOTIVE REMOTE TIRE MONITOR SYSTEM

(75) Inventors: William David Stewart, Antrium (IE); Idir Boudaoud, Creteil (FR); Thomas David Stephen McClelland, Craigavon (IE)

(73) Assignee: Schrader Bridgeport International, Inc. CO (US)

( * ) Notice: Subject to any disclaimer, the term of this patent is extended or adjusted under 35 U.S.C. 154(b) by 194 days.

(21) Appl. No.: 11/104,699

(22) Filed: Apr. 13, 2005

(65) Prior Publication Data

US 2006/0017554 A1 Jan. 26, 2006

Related U.S. Application Data

(63) Continuation-in-part of application No. 11/030,837, filed on Jan. 7, 2005, which is a continuation of application No. 10/021,284, filed on Oct. 29, 2001, now Pat. No. 6,882,270.

(51) Int. Cl.
*G08B 13/14* (2006.01)

(52) U.S. Cl. ............... 340/572.1; 340/686.1; 340/531; 340/539.1

(58) Field of Classification Search ............. 340/572.1, 340/425.5, 438, 442, 445, 447, 686.1, 539.1, 340/448, 446, 531; 73/146.2, 723; 200/61.22
See application file for complete search history.

(56) References Cited

U.S. PATENT DOCUMENTS

| | | | |
|---|---|---|---|
| 5,602,524 A | 2/1997 | Mock et al. | |
| 5,612,671 A * | 3/1997 | Mendez et al. | 340/447 |
| 5,774,047 A * | 6/1998 | Hensel, IV | 340/442 |
| 5,838,229 A | 11/1998 | Robinson, III | |
| 6,018,993 A | 2/2000 | Normann et al. | |
| 6,034,597 A | 3/2000 | Normann et al. | |
| 6,062,072 A * | 5/2000 | Mock et al. | 73/146.5 |
| 6,112,585 A | 9/2000 | Schrottle et al. | |
| 6,112,587 A | 9/2000 | Oldenettel | |
| 6,181,241 B1 | 1/2001 | Normann et al. | |
| 6,218,936 B1 | 4/2001 | Imano | |
| 6,252,498 B1 | 6/2001 | Pashayan, Jr. | |
| 6,259,361 B1 | 7/2001 | Robillard et al. | |
| 6,271,748 B1 | 8/2001 | Derbyshire et al. | |
| 6,304,172 B1 | 10/2001 | Katon et al. | |

(Continued)

FOREIGN PATENT DOCUMENTS

EP 0 760 299 B1 7/1996

*Primary Examiner*—Daniel Previl
(74) *Attorney, Agent, or Firm*—Brinks Hofer Gilson & Lione

(57) ABSTRACT

A tire monitor system employs a single RF detector mounted on the vehicle. The tire monitor system also includes a control unit and a receiver. The single RF detector is positioned to be proximate a front axle or a rear axle. The RF detector also may be positioned off-center. The control unit distinguishes front tire monitors from rear tire monitors by comparing a number of RF transmissions received by each tire monitor. The control unit also may distinguish between left tire monitors and right tire monitors by comparing the number of RF transmissions received by each tire monitor. In other embodiment, the tire monitor system may further use a received signal strength and/or acceleration signals to determine position information of the tire monitors.

24 Claims, 10 Drawing Sheets

U.S. PATENT DOCUMENTS

| | | | |
|---|---|---|---|
| 6,362,731 B1 * | 3/2002 | Lill | 340/445 |
| 6,384,720 B1 * | 5/2002 | Juzswik et al. | 340/442 |
| 6,489,888 B1 * | 12/2002 | Honeck et al. | 340/442 |
| 6,580,365 B2 * | 6/2003 | Starkey | 340/447 |
| 6,581,449 B1 | 6/2003 | Brown et al. | |
| 6,633,229 B1 | 10/2003 | Normann et al. | |
| 6,705,155 B2 | 3/2004 | Katou | |
| 6,788,193 B2 | 9/2004 | King et al. | |
| 6,794,993 B1 * | 9/2004 | Kessler et al. | 340/870.16 |
| 2001/0002451 A1 | 5/2001 | Breed | |

* cited by examiner

DETERMINATION OF WHEEL SENSOR POSITION USING A SINGLE RADIO FREQUENCY DETECTOR IN AN AUTOMOTIVE REMOTE TIRE MONITOR SYSTEM

PRIORITY CLAIM

This application is a continuation-in-part of application Ser. No. 11/030,837 filed Jan. 7, 2005, which is a continuation of application Ser. No. 10/021,284 filed Oct. 29, 2001 U.S. Pat. No. 6,882,270, each of which is incorporated herein in its entirety by this reference. This application also relates to application Ser. No. 10/125,043 filed Apr. 18, 2002 in the names of William David Stewart, Idir Boudaoud and Thomas David Stephen McClelland and commonly assigned to the owner of the present application, which is incorporated herein in its entirety by this reference.

BACKGROUND

1. Technical Field

The invention relates generally to a remote tire monitoring system. More particularly, the invention relates to a method and apparatus for determining wheel sensor position using a single radio frequency detector.

2. Background Information

Systems have been developed to monitor a characteristic such as tire pressure of a vehicle and to report the characteristic to a receiver at a central monitoring station using radio transmissions. A monitor is located at each tire and periodically takes a measurement of the tire characteristic. The monitor then transmits the results of the measurement in a radio frequency transmission to the central monitoring station which produces an alarm or a display in response to the measurement.

One problem with such systems has been the need to program the location of the transmitters at the central station. To be fully useful, the tire characteristic data is preferably associated with the tire which originated the measurement when presenting a display or alarm. Each monitor includes identification information which can be transmitted with the measurement. The tire monitor is preferably activated to produce this information and the information is then conveyed to the central station and associated with the position of the tire.

In the technique of U.S. Pat. No. 5,600,301, the tire monitors each include a reed switch or other magnetic device. A magnet is passed near the reed switch, causing the monitor to transmit a radio frequency transmission that includes identification data. A service technician repeats this process at each wheel and then loads the identification and position information into the central monitoring station. Another method provides a printed bar code on each tire monitor which contains the identification information and which may be read with a suitable bar code reader.

In U.S. Pat. No. 5,880,363, an activation signal is provided from the central controller to a low frequency transmitter at each wheel well. The transmitter generates a low frequency signal to activate the tire monitor. The tire pressure monitor responds by generating a long wave identification signal and transmitting that signal with tire pressure and identification data directly to the control unit. The long wave identification signal is used to identify the position of the tire by distinguishing this transmission from other transmissions received by the controller.

U.S. Pat. No. 5,883,305 discloses two-way communication of data by radio signals. A tire pressure monitor is activated by a radio frequency signal transmitted by an antenna in the wheel well adjacent the tire. The tire pressure monitor transmits a second radio frequency signal which is detected by the wheel well antenna. The second signal is demodulated to detect that tire pressure data.

These previous techniques have been limited in effectiveness. The magnetic programming technique may be subject to interference and crosstalk, for example in a factory where many such tire monitors are being assembled with tires and vehicles. The bar code label system requires a label at each tire which can be lost or become dirty or illegible. The apparatus for transmitting a long wave activation signal and generating a long wave identification signal therefrom is too expensive for some applications. The two-way data communication techniques require demodulation of the received radio signals at the wheel well and coaxial cabling back to the central controller, both of which add to the cost of the system.

A further limitation of some of these prior techniques is the manual operation requiring activation by a service technician. A system is desired which automatically conveys wheel position data to the receiver. Such a system would be particularly useful after any change in tire position, such as tire rotation or replacement of a tire.

U.S. Pat. No. 6,518,876, commonly assigned with the present application, discloses a system and method in which tire monitors are located at each wheel of the vehicle and periodically transmit tire data along with a tire monitor identifier. Four small, inexpensive RF detectors are located near each wheel. Each RF detector is connected to the central control unit by a power line and a ground line. When a tire monitor transmits data by emitting an RF transmission, the RF detector that is closest to the transmitter will detect the burst of RF energy. The RF detector responds to the RF energy by modulating the power line to the control unit with the envelope of the transmitted data. The control unit detects this modulation on one of its power lines. Also, the RF receiver of the control unit receives and demodulates the data transmitted by the tire monitor. The control unit associates the received data with the position indication provided by the modulation on the power line. When the positions of the wheels on the vehicle are changed, the control unit can determine the new position using the modulated power line in association with the tire monitor identifier in the transmitted data.

While this system has been very successful in application, a system featuring reduced cost and weight is desired. The cables that must be run from the control unit to all four RF detectors add substantially to the cost and weight of an installation. Accordingly, there is a need for a system and method which provide the operational advantages of the earlier system in a system offering reduced complexity, parts count, weight and cost.

BRIEF SUMMARY

By way of introduction only, a tire monitor for use in conjunction with a remote tire monitoring system of a vehicle includes in one embodiment a single radio frequency (RF) detector, a receiver and a control unit. The RF detector is associated with a plurality of tire monitors to detect RF transmissions. Upon detection, the RF detector generates a transmission indication. Apart from the RF detector, the receiver is operable to receive tire information from the plurality of tire monitors. The control unit is coupled with the RF detector and the receiver and operates to determine position of the plurality of tire monitors.

In other embodiment, a remote tire monitor system for use with a vehicle having a front side, a rear side, a left side and a right side includes a single detector, a receiver and a control unit. The single detector is configured to position proximate one side of the vehicle. The single detector generates a transmission indication in response to RF transmissions from at least one of the plurality of tire monitors. The receiver is operable to receive the tire information and the control unit is coupled with the single detector and the receiver. The control unit is operable to determine a position of the plurality of tire monitors based on the detected transmission indications and the tire information.

In another embodiment, a tire monitor method for a tire monitor positioned at a wheel of a vehicle includes detecting RF transmissions from a plurality of tire monitors and receiving tire data from the plurality of tire monitors. The tire monitor method further includes determining positions of the plurality of tire monitors based on the detected RF transmissions and the tire data.

The foregoing discussion of the preferred embodiments has been provided only by way of introduction. Nothing in this section should be taken as a limitation on the following claims, which define the scope of the invention.

DETAILED DESCRIPTION OF THE DRAWINGS AND THE PRESENTLY PREFERRED EMBODIMENTS

Figure 1:
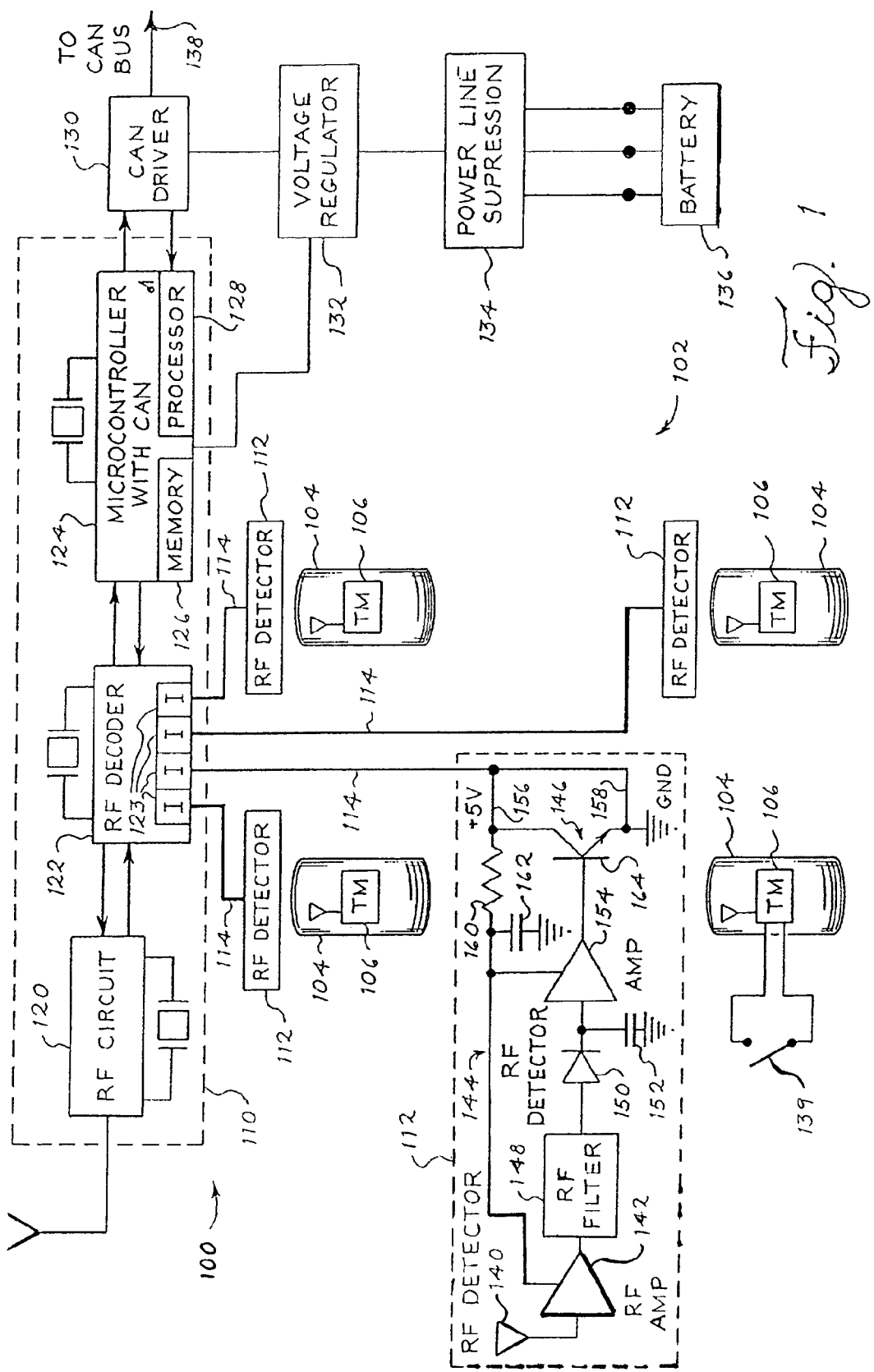
FIG. 1 is a block diagram of one embodiment of a remote tire monitor system shown in conjunction with portions of a vehicle.

Referring now to the drawing, it is a block diagram of a remote tire monitor system 100 shown in conjunction with portions of a vehicle 102. The vehicle 102 includes in this example four tires 104. Other numbers of tires may be included, such as a fifth tire as spare or additional tires if the vehicle is a truck, trailer or other multi-wheeled vehicle.

Associated with each of the tires 104 is a transmitter or tire monitor 106. Each of the tire monitors 106 includes a battery powered, radio frequency (RF) transmitter. Any suitable tire monitor may be used. U.S. patent application Ser. No. 09/245,938, entitled "Method And Apparatus For A Remote Tire Pressure Monitor System," filed Feb. 5, 1999 in the name of McClelland et al., and commonly assigned with the present application is incorporated herein by reference and illustrates one suitable tire monitor for use in the remote tire pressure monitor system 100. Each tire monitor 106 includes a sensor such as a pressure sensor for measuring a tire characteristic. The tire monitor 106 converts the measured tire characteristic to tire data. The tire data is encoded for transmission from the tire monitor 106.

The tire monitor further includes a transmitter configured to transmit RF signals including the tire data. In some embodiments, the transmissions are encoded or randomized to minimize clashes at a receiver. For example, U.S. patent application Ser. No. 09/245,577, entitled "Method For Communicating Data In A Remote Tire Pressure Monitoring System," filed Feb. 5, 1999 in the name of Bailie, et al., and commonly assigned with the present application is incorporated herein by reference. This application shows a technique in which data words are transmitted separated by a time delay. The time delay for each respective data word is defined according to a repeating pattern common to the tires so that data words are transmitted during a plurality of aperiodic time windows. Transmission parameters such as modulation techniques, transmission frequency and transmission power are chosen according to local regulations and to assure reliable reception of the RF signals.

The tire monitor 106 includes a motion switch 139. The motion switch 139 closes upon detection of movement of the vehicle 100. The motion switch 139 provides a signal to the processor 124 indicating closure of the switch 139 and motion of the vehicle. In response to closure of the switch, the tire monitor system 100 begins operating, for example, by transmitting tire data. In the illustrated embodiment, during normal operation, the tire monitor 106 transmits supervisory tire pressure information once every minute. Any suitable motion switch may be used for the switch 139.

The remote tire monitor system 100 includes a control unit 110 and a plurality of radio frequency (RF) detectors 112. In alternative embodiment, the remote tire monitor system 100 additionally includes a user display for providing user information such as tire pressure information and low tire pressure alarms. In the illustrated embodiment, each RF detector 112 is mounted on the vehicle 102 proximate an associated tire monitor 106 to detect the RF signals from the associated tire monitor 106 and produce a transmission indication in response to detected RF signals. Each of the RF detectors 112 is electrically coupled by a conductor 114 to the control unit 110. Structure and operation of the RF detectors 112 will be described in greater detail below.

The control unit 110 includes an RF receiver 120, an RF decoder 122, and a controller 124. The RF receiver 120 is configured to receive RF signals conveying tire data from at least one transmitting tire monitor 106 of the plurality of tire monitors 106 associated with the wheels or tires 104 of the vehicle 102. Any suitable RF receiver circuit may be used. The design and implementation of the RF receiver 120 will depend on the type of modulation used for the RF signals, transmission frequency for the RF signals, and physical limitations such as permitted size, weight and power dissipation.

The RF decoder 122 is configured to receive a transmission indication from at least one receiving RF detector 112 of a plurality of RF detectors 112 associated with wheels or tires 104 of the vehicle 102. Thus, a tire monitor 106 will transmit RF signals which are detected by the RF detector 112 associated with the transmitting tire monitor 106. The receiving RF detector 112 signals its detection of the RF signals by providing the transmission indication on its associated conductor 114.

The RF decoder 122 is further configured to identify a position of a transmitting tire monitor on the vehicle in response to the transmission indication received from an RF detector. Accordingly, the RF decoder 122 includes a plurality of input circuits 123 coupled to the conductors 114 which are in turn coupled to the RF detectors 112. A transmission indication impressed on a conductor 114 is detected by an associated input circuit 123. In the illustrated embodiment, there is a one-to-one relationship between input circuits 123 and RF detectors 112. In this manner, the RF detector 112 which originated the transmission indication may be identified by the RF decoder determining which input circuit 123 detects the transmission indication. In alternative embodiments, the RF decoder 122 may include fewer than four input circuits 123 which are multiplexed in some manner among the plurality of RF detectors 112. For example, a single input circuit 123 may be time shared among the plurality of RF detectors 112 to reduce the cost and complexity of the RF decoder 122.

The RF decoder 122 is electrically coupled with the RF circuit 120. Upon receipt of RF signals at the RF circuit 120, the RF signals are demodulated to extract the tire data contained within the RF signals. In some applications, additional data decoding may be required after demodulation. The tire data in one exemplary embodiment includes a tire monitor identifier, or unique identification code which uniquely identifies the tire monitor 106 which transmitted the RF signals. In addition, in this exemplary embodiment, the tire data also includes tire pressure data related to a sensed tire pressure of the tire 104 at which the transmitting tire monitor 106 is located. Alternative tire data may be included or substituted for the tire pressure data, such as a number of tire revolutions, tire temperature, and so forth.

After extracting the tire data from the RF signals, the tire data is conveyed from the RF receiver 120 to the RF decoder 122. The RF decoder 122 associates the tire data with a position of the transmitting tire monitor 106 on the vehicle 102. Position information is determined using the input circuit 123 and a transmission indication received over a conductor 114 from RF detector 112. The tire data and associated tire position are conveyed from the RF decoder 122 to the controller 124.

The controller 124 controls the operation of the remote tire monitor system 100. The controller 124 is preferably a microcontroller including a processor 128 and a memory 126. The processor 128 operates in response to data and instructions stored in the memory 126 to control overall operation of the system 100.

In the illustrated embodiment, the processor 128 stores position data for a plurality of tire monitors 106 of the remote tire monitor system 100. The controller 124 is electrically coupled to the RF decoder 122 to receive tire data and position data from the RF decoder 122. In the illustrated embodiment, when tire data and position data are received at the microcontroller 124, the processor 128 retrieves stored position data from the memory 126. In one embodiment, the position data are stored in association with a position on the vehicle, such as left front, left rear, right front or right rear. The received position data is compared with the stored position data. If there is no change, the position data is not updated and further processing may occur using the received tire data. However, the processor 128 updates the position data for the transmitting tire monitor 106 when the position of the transmitting tire monitor 106 varies from the stored position data for the transmitting tire monitor. Thus, the controller 124 includes a memory 126 and a processor configured to store in the memory 126 position of the plurality of tire monitors 106 including the position of the transmitting tire monitor which originated the received position data.

In an alternative embodiment, the memory 126 is not used for storage of position data. Rather, the received tire data is associated by the control unit 110 with the position information provided by the transmission indication from a RF detector 112. The tire data and the position information from the input circuit 123 are used together to produce a display or alarm, if appropriate, by the system 100. Additionally, in still another embodiment, the tire data omits any identifying information for the transmitting tire monitor 106 and again, the tire data and the position information from the input circuit 123 are used together to produce the appropriate display or alarm.

Completing the identification of the elements in FIG. 1, the vehicle 102 further includes a CAN driver 130, a voltage regulator 132, power line noise suppressor 134, and a battery 136. The battery 136 provides operating power for electrical systems of the vehicle 102 including the remote tire monitor system 100. The battery 136 is a portion of the electrical power system of the vehicle, which typically also includes an alternator and other components. Such electrical power systems for vehicles are well known. The power line suppressor 134 reduces noise on the power line from the battery 136. Noise may originate in other electrical components of the vehicle 102, such as the ignition system. The voltage regulator 132 receives the battery voltage or other operating voltage from the power line suppressor 134 and produces a well regulated voltage for components such as the control unit 110 and CAN driver 130. The CAN driver 130 provides electrical interface with other elements of a Controlled Area Network. Controlled Area Network or CAN is a serial communication protocol for data commonly used in automotive and other applications. The CAN bus 138 accessed by the CAN driver 130 is used to interconnect a network of electronic nodes or modules. The CAN bus operates according to an adopted standard. In conjunction with a remote tire pressure monitor system 100, the CAN bus 138 may be used to convey tire monitor data to other locations in the vehicle 102. For example, an alarm or a display (not shown) may be controlled to provide a visual or audible indication to an operator of the vehicle 102 that the tire data indicates an out-of-range condition, such as low tire pressure.

In FIG. 1, the RF decoder 122 and the controller 124 are shown as separate elements of the control unit 110. In alternative embodiments, they may be combined in a single processor or logic block or circuit. Any other illustrated elements or additional elements included to enhance the functionality of the system 100 may be integrated or combined with other components of the system 100.

Further, the system 100 should not be restricted to use in conjunction with a CAN bus. In alternative embodiments, any other communications medium may be employed for interconnecting the system 100 with other elements of the vehicle 102. For example, communication buses in accordance with the J-1850 or USB standards may be substituted, or the control unit 110 may be directly hard wired with other elements of the vehicle 102. Still further, external communications may be omitted entirely so that the system 100 is completely self-contained.

FIG. 1 further shows a detailed view of one embodiment of an RF detector 112 for use in the remote tire monitor system 100. The RF detector 112 includes an antenna 140 to sense radio frequency (RF) signals transmitted from the tire monitor 106, an amplifier 142, an envelope detector coupled to the antenna 140 through the amplifier 142 and an output circuit 146 coupled to the envelope detector 144. The envelope detector 144 includes a filter 149, a diode 150, a capacitor 152 coupled to ground and an amplifier 154. The RF detector 112 is powered from a power line 156 and a ground line 158 provided on the conductor 114 which couples the RF detector 112 to the input circuit 123 of the RF decoder 122. To isolate the operational circuitry of the RF detector 112 from noise on the power line 156, the RF detector 112 further includes a resistor 160 and a capacitor 162 to ground.

The envelope detector 144 responds to the input signals received at the antenna and amplified by the amplifier 142 to produce at the output circuit 146 data corresponding to the envelope of the RF signals transmitted by the tire monitors 106. Thus, the filter 148, diode 150 and capacitor 152 together form a circuit coupled with the antenna 140 to detect an envelope of electrical signals produced by the antenna in response to the RF signals. The envelope is itself an electrical signal which is amplified in the amplifier 154. The output signal from the amplifier 154 is applied to the base of a transistor 164. In response to this signal at its base, the transistor 164 modulates a wireline signal on the conductor 114 in response to the envelope of the RF signals received at the RF detector 112. That is, the signals applied at the base of the transistor 164 control turn-on of the transistor 164, conducting current from its collector at the power node of the conductor 114 to its emitter at the ground node of the conductor 114. As a result, the current in the conductor 114 will be modulated in response to the RF signals received at the antenna 140 of the RF detector 112.

In one embodiment, to detect the modulated current, the input circuits 123 of the RF decoder in the illustrated embodiment may include a current mirror which duplicates the current drawn from the input stage of the input circuit 123, coupled to the conductor 114. The output current from the current mirror in the input circuit 123 is provided to a resistor which converts the current signal into a voltage signal which can be read by the microcontroller 124. Suitable current mirror circuits are within the purview of those ordinarily skilled in the art of circuit design.

In this manner, then, the signal provided on the conductor 114 forms a transmission indication indicating that the tire monitor 106 associated with the RF detector 112 has transmitted an RF signal which was detected by the RF detector 112. Producing the transmission indication includes detecting the envelope of the RF signals transmitted by the tire monitor 106 and producing a wireline signal on the conductor 114 in response to the envelope of the RF signals. In particular, in the illustrated embodiment, the wireline signal is produced by modulating a current in a conductor 114 coupled with the control unit 110. The control unit 110 detects the modulation of the current to locate the transmitting tire monitor 106.

Significantly, the RF detector 112 does not demodulate the data transmitted by the tire monitor 106. Only the RF circuit 120 of the control unit 110 demodulates the data to extract the contents of the RF signal 106. The RF detector only senses the presence of the transmitted RF signals. This reduces the cost of the RF detectors 112 and the overall cost of the remote tire monitor system 100.

Also, by modulating the current in the conductor 114, the RF detector's sensitivity to noise is reduced. Noise will occur in the form of voltage spikes or pulses on the conductor 114. However, this noise will have little effect on the operation of the RF detector 112 and will have little effect on the current levels in the conductor. As a result, the conductor 114 can be, for example, a twisted pair of wire or any other inexpensive two-wire cable. Coaxial cable or other shielded cable is not necessary for implementing the system 100 using RF detector 112.

In alternative embodiments, the RF circuit 120 may be omitted. In such an embodiment, the RF detectors 112 are used to detect the variations in the radio frequency signals and modulate a wire line signal on the conductors 114. The RF decoder 122 in such an embodiment is configured to demodulate the data in conjunction with the microcontroller 124. Current pulses on the conductor 114 are detected by the RF decoder 122 and converted to voltage pulses. The voltage pulses can be read by the microcontroller 124. In this manner, microcontroller 124 obtains the data from the RF detectors and the RF decoder, without use of an RF circuit 120. This has the advantage of eliminating the relatively expensive RF circuit. Further, this permits reduction in the transmit power used by the tire monitors 106 to transmit the radio frequency signals conveying the entire data. In some jurisdictions, substantially attenuated transmit power is required for applications such as tire monitors. These low transmit power requirements may be satisfied while still providing reliable performance in the remote tire monitoring system 100 by use of the RF detectors 112.

In still other embodiments, the functionality described herein may be implemented using a programmed computer or other processor operating in response to data and instructions stored in memory. The processor may operate in conjunction with some or all of the hardware elements described in the embodiments shown herein.

The disclosed tire monitor system may be used to provide an improved auto learn or auto train method for automatically identifying positions of a plurality of tire monitors on a vehicle. As noted above, previously devices such as a transponder or magnetic activation tools were used in the car plant to train the control unit of the remote tire monitor system with identifiers for the wheel sensors or tire monitors. With the vehicle located in a training booth or activation area at the factory, the wheel sensors were activated in sequence and the control unit, expecting activated pressure transmissions in a certain order, learned the identification and position on the vehicle of the wheel sensors. So as to prevent cross talk from other training booths, each activation area is required to be RF shielded. Another method of training the receivers was to use bar code readers to scan the identifiers of the wheel sensors and input this data into the receiver. All of these methods required an additional operation either manually or by automatic readers. These operations add cost and potential for downtime.

In the illustrated embodiment of FIG. 1, no such tools are required. In the car plant at the end of the production line, a standard one to two minute dynamic test is used to test and calibrate steering, brakes etc. of the vehicle. For the illustrated embodiment, positions and identities of the four tire pressure monitor wheel sensors are automatically learned during this dynamic test.

This is achieved by placing the control unit or receiver in a "learn state" at a dynamic test booth. The wheel sensors transmit either once a minute as in the normal mode, or in a special initial mode corresponding to a brand new, right out of the box state, transmitting more often, for example every 30 seconds, or every 10 seconds.

For example, when the wheel sensors leave the manufacturer's production line, they are placed in off mode. This mode means that each wheel sensor is dormant until it is activated by the closing of its motion switch. Closing the motion switch is only achievable through centrifugal force caused by spinning the tire monitor on a rotating wheel. During normal operation, the wheel sensor, while driving, transmits tire information including supervisory tire pressure once every minute. However, in the illustrated embodiment, for the driving periods during the first 16 activations of the motion switch, the wheel sensor will transmit the supervisory pressure data once every 30 seconds (to conform to United States regulatory requirements) or 10 seconds outside the United States. Other time intervals may be used. After the initial 16 transmissions, or any other suitable number, the transmission interval is changed to its normal mode value, such as one minute. This initial mode is known as factory test mode.

At the time of the dynamic vehicle test, the vehicle is accelerated, causing the wheel sensors to activate with the rotation of the wheels and associated closure of their motion switches. When the wheel sensors begin transmitting tire pressure, say once every thirty seconds, each sensor's identifier is transmitted by the sensor and is received up by the RF circuit of the control unit. In this initial unlearned state, the receiver loads the new identifier into memory, associating the transmission with one of the four RF detectors. Only data received which also is synchronized to activity on one of the RF detector conductors is regarded as valid. Over the one to two minute duration of the dynamic test, each wheel sensor will transmit numerous times and the control unit can verify the tire information, such as each wheel sensor identifier, and associated wheel position. The control unit can then load this data into non-volatile memory for subsequent normal use.

Key advantages of this auto-learn technique is the lack of any additional labor or equipment at the vehicle assembly plant, and the lack of a need for a transponder component or magnetic switch in the wheel sensor. Also there is no possibility of learning the wrong wheels, from other vehicles due to cross talk or of getting the wrong position. Thus, cost is reduced, operation is simplified and reliability is increased. Using the illustrated embodiment of the tire monitor system, no additional activation or learning tools are required to train the control unit with the wheel sensors' position on the vehicle. The only device required to train the control unit is the standard dynamic vehicle test at the end of line test in the vehicle assembly plant. Because the training procedure can be carried out in parallel with the steering and braking tests on the rolling road, and because of the factory test mode feature, no extra time or cost is required to 'auto learn' the tire monitor system.

The illustrated embodiment further provides for automatic update of tire monitor position information in the control unit upon replacement of one of the tire monitors of the system. This would occur, for example, if one of the wheels or tires of the vehicle is replaced. Due to the nature of the current embodiment, where the RF detectors are continuously indicating the position of the wheel sensors, a wheel sensor may be replaced and detected by the control unit without the need for user intervention. In this case, where a new wheel sensor is put on a wheel, the control unit initially realizes it is receiving a wrong identifier for the tire monitor, but still getting RF detector pulses from a particular wheel position. In addition, the control unit detects that the previously stored identifier for that position is no longer being received. Over a period of time, say ten minutes driving, the receiver verifies it has stopped receiving a stored identifier and is now receiving a new ID for that position. After verification, the new identifier is stored for that position and operation continues as normal.

The big advantage of this is the lack of need for user intervention and elimination of the need for a service tool at each service location. Tire monitor position and identification is updated automatically.

Figure 2:
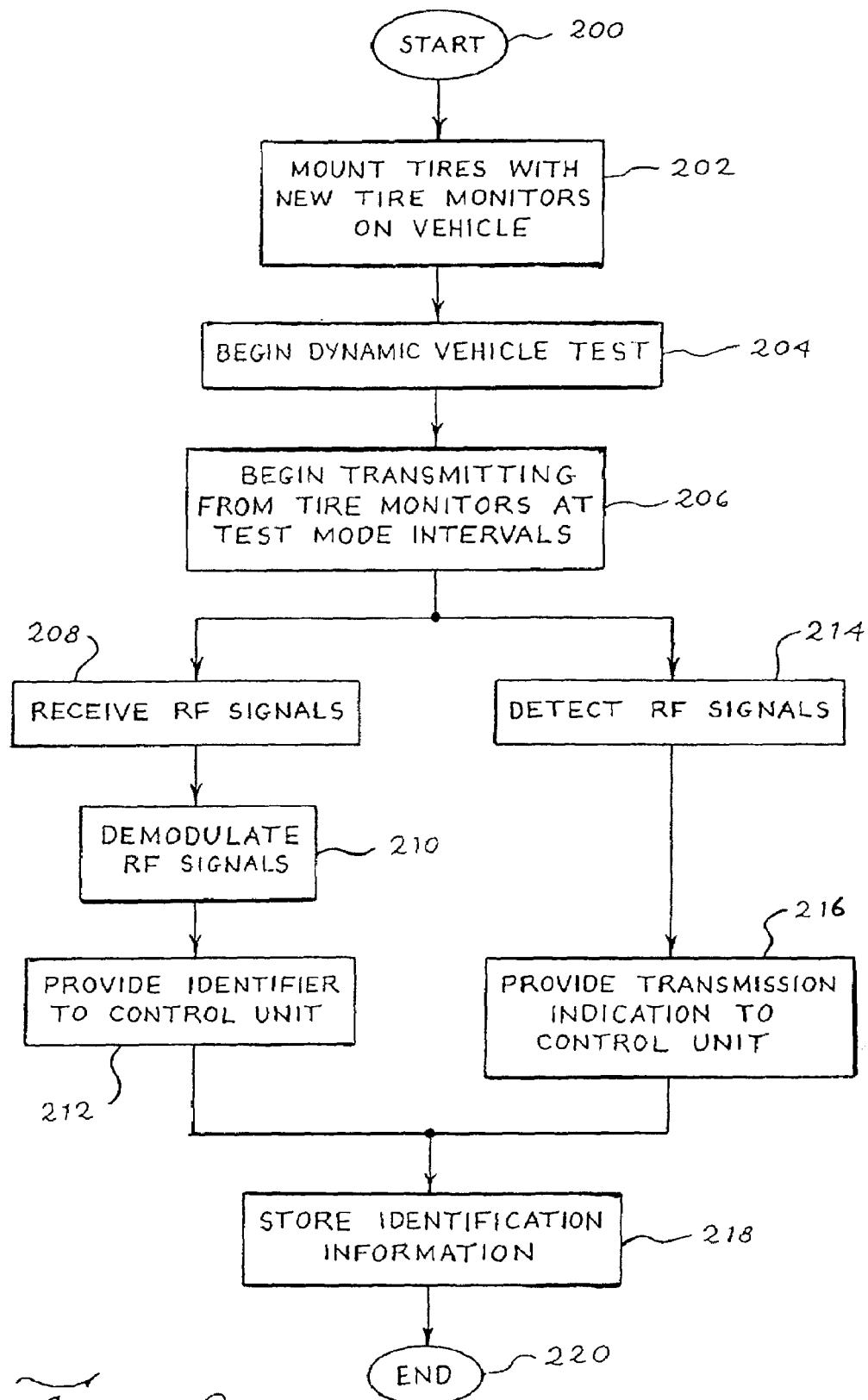
FIG. 2 is a flow diagram illustrating one embodiment of an auto learn method for the remote tire monitor system of FIG. 1.

FIG. 2 is a flow diagram illustrating an auto learn method for the remote tire monitor system of FIG. 1. The method begins at block 200. At block 202, one or more tires with new tire monitors are mounted on a vehicle which includes a remote tire monitor system. In this embodiment, the tire monitors are in unused, out of the box condition from the manufacturer. The installation of block 202 may occur as part of the final assembly of the vehicle at the factory. Alternatively, the installation may occur when new tires are installed on the vehicle or when a remote tire monitor system is added to the vehicle.

At block 204, the dynamic vehicle test is initiated and, in response, at block 206, the tire monitors begin transmitting radio frequency (RF) signals. The dynamic vehicle test is a test to check proper functionality of the systems of the vehicle, including drive train and brakes. Alternatively, any activity which causes the tire monitors to begin transmitting may be substituted at block 204 to initiate transmission at block 206. For example, the process of driving the vehicle from the end of the assembly line to a storage area or a final checkout area in block 204 may be adequate to begin transmission at block 206. It is contemplated that the tire monitors each include a motion switch which activates the tire monitor in response to motion of the tire monitor on the wheel of the vehicle.

Further, at block 206, the tire monitor begins transmitting at a test mode interval, such as once every 30 or 60 seconds. This aspect may be omitted but adds convenience for initializing the tire monitor system. After initialization, the interval may be reduced to reduce power drain from the battery which powers the tire monitor.

After transmission of the RF signals at block 206, the RF signals are received by a receiver of the remote tire monitor system at block 208. The RF signals are demodulated, decoded and otherwise processed to extract the data conveyed on the RF signals. For example, the tire monitor may modulate a carrier signal using data corresponding to pressure of the tire or a tire monitor identifier. The receiver of the remote tire monitor system demodulates the received RF signals to receive the data. At block 212, the data including a tire monitor identifier, if any, is provided to a control unit of the remote tire monitor system.

Meanwhile, the same RF signals received and demodulated at blocks 208, 210 are detected at block 214. In the preferred embodiment, the RF signals are received without demodulation, for example, using a detector of the type illustrated above in conjunction with FIG. 1. Other suitable RF detectors may be used. At block 216, in response to the detected RF signals, a transmission indication is provided to the control unit. The transmission indication indicates to the control unit which RF detector of the vehicle detected the RF signals transmitted by the tire monitor and received by the receiver at block 208.

At block 218, identification information associated with the tire monitor is stored. In one embodiment, the data forming the identifier transmitted by the tire monitor and received by the receiver of the remote tire monitor system is stored in memory. Other types and formats of identification information may be stored. For example, the control unit may store an RF detector indicator which indicates which RF detector detected the received RF signals.

In this manner, the described method provides automatic learn capability in a remote tire monitor system. No manual intervention is necessary for the control unit to identify and store the identities and locations of individual tire monitors on the vehicle. This reduces time and cost associated with initiating operation of the remote tire monitor system.

Figure 3:
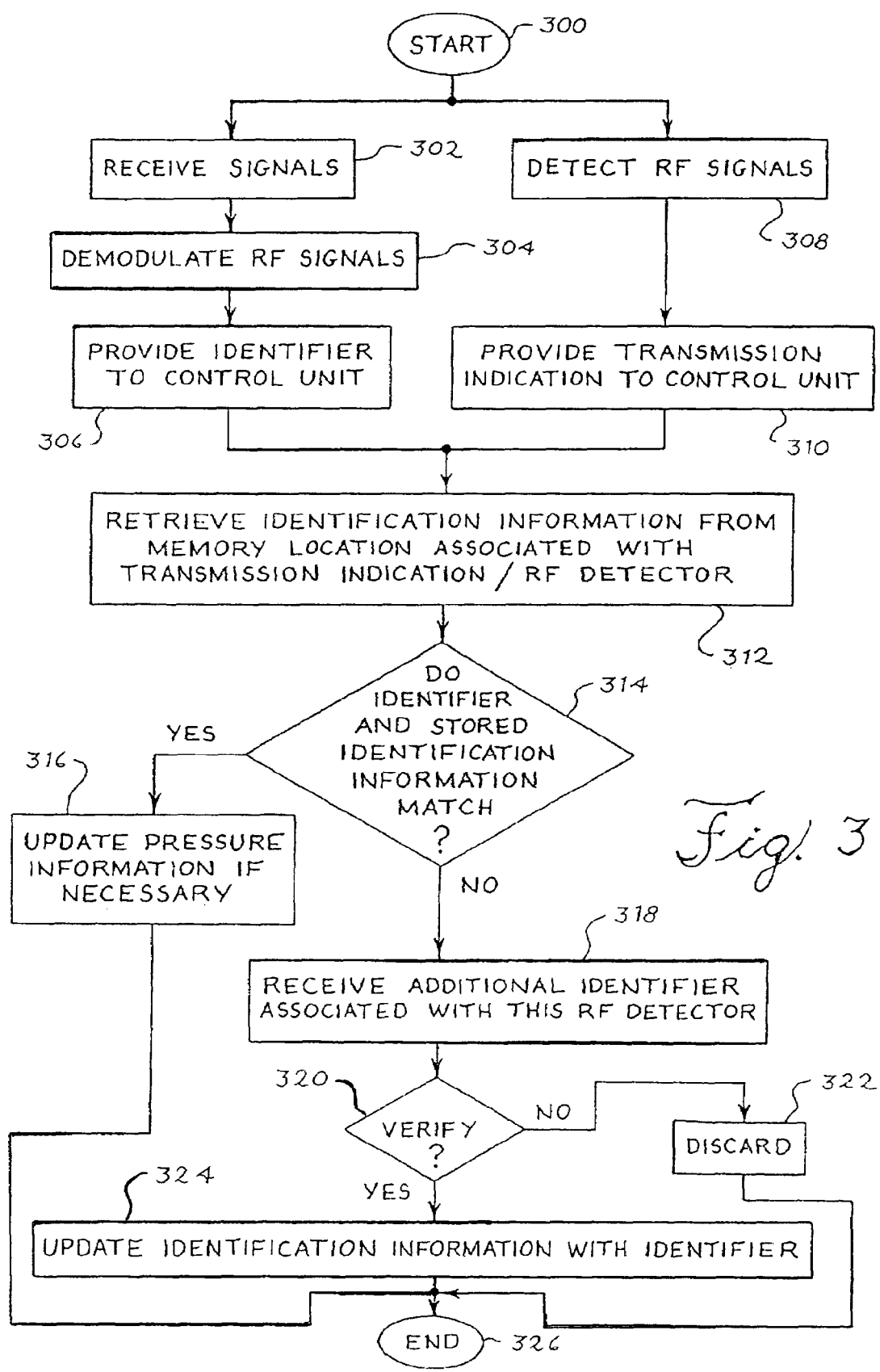
FIG. 3 is a flow diagram illustrating one embodiment of an auto learn method for the remote tire monitor system of FIG. 1.

FIG. 3 is a flow diagram illustrating an auto learn method for the remote tire monitor system of FIG. 1. The method of FIG. 3 starts at block 300.

At block 302, RF signals transmitted by a tire monitor associated with a wheel of a vehicle are received by a receiver of the remote tire monitor system. At block 304, the RF signals are demodulated, decoded and otherwise processed to extract the data conveyed on the RF signals. For example, the tire monitor may modulate a carrier signal using data corresponding to pressure of the tire or a tire monitor identifier. The tire monitor identifier may be a serial number or other unique or nearly-unique data associated with the tire monitor. For example, the tire monitor identifier may be multiple bit data stored in the tire monitor at the time of manufacture of the tire monitor. The receiver of the remote tire monitor system demodulates the received RF signals to receive the data. At block 306, the data including a tire monitor identifier, if any, is provided to a control unit of the remote tire monitor system.

Meanwhile, the same RF signals received and demodulated at blocks 302, 304 are detected at block 308. In the preferred embodiment, the RF signals are received without demodulation, for example, using a detector of the type illustrated above in conjunction with FIG. 1. Other suitable RF detectors may be used. At block 310, in response to the detected RF signals, a transmission indication is provided to the control unit. The transmission indication indicates to the control unit which RF detector of the vehicle detected the RF signals transmitted by the tire monitor and received by the receiver at block 302.

At block 312, stored identification information is retrieved from memory at the control unit. In the illustrated embodiment, the identification information is stored at a memory location associated with the transmission indication or RF detector. Thus, the control unit receives a wireline indication from a receiving RF detector that a transmission has been received. Using the wireline indication, the control unit selects the memory location from which previous identification information is retrieved.

At block 314, the control unit determines if the identifier received from the transmitting tire monitor matches the stored identification information. In this application, a match may mean a bit-by-bit match of received and stored data or some other level or association between the received data and the stored data. If the data match, at block 316, the tire information such as pressure data are updated. For example, in one embodiment, tire pressure data are stored along with the identification information for the tire monitor. If the received tire pressure data varies by a predetermined amount from the stored tire pressure data, the received tire pressure data is stored and an alarm or other user indication is generated.

At block 318, if there is no match between the received identifier and the stored identification information, the method waits for receipt of an additional transmission associated with this RF detector. Preferably, the tire monitor transmits pressure data and a tire monitor identifier periodically, such as once per minute. Upon receipt of a subsequent transmission, at block 320, the method attempts to verify the previously received tire monitor identifier. This is done by comparing the newly received tire monitor identifier and the previously received tire monitor identifier to determine if there was an error in communication of the previously received tire monitor identifier. In some embodiments, multiple subsequent transmissions may be received for comparison. If there is no verification, at block 322, the mismatched transmission received at block 302 is discarded. This condition indicates that the same tire monitor continues to transmit, and the mismatched transmission was received with an error.

If at block 320 the newly received data verify the previously received data, the identification information stored for this RF detector is updated with the tire monitor identifier from the received transmission. This condition indicates that the tire monitor has been changed and is communicating reliably. In this manner, the illustrated system and method provide automatic update capability after a tire monitor has been changed. This may occur if the tires of the vehicle are rotated or if one or more tires is replaced. There is thus no need to manually intervene for the remote tire monitor system to update the identities and locations of the tire monitors on the vehicle.

Figure 4:
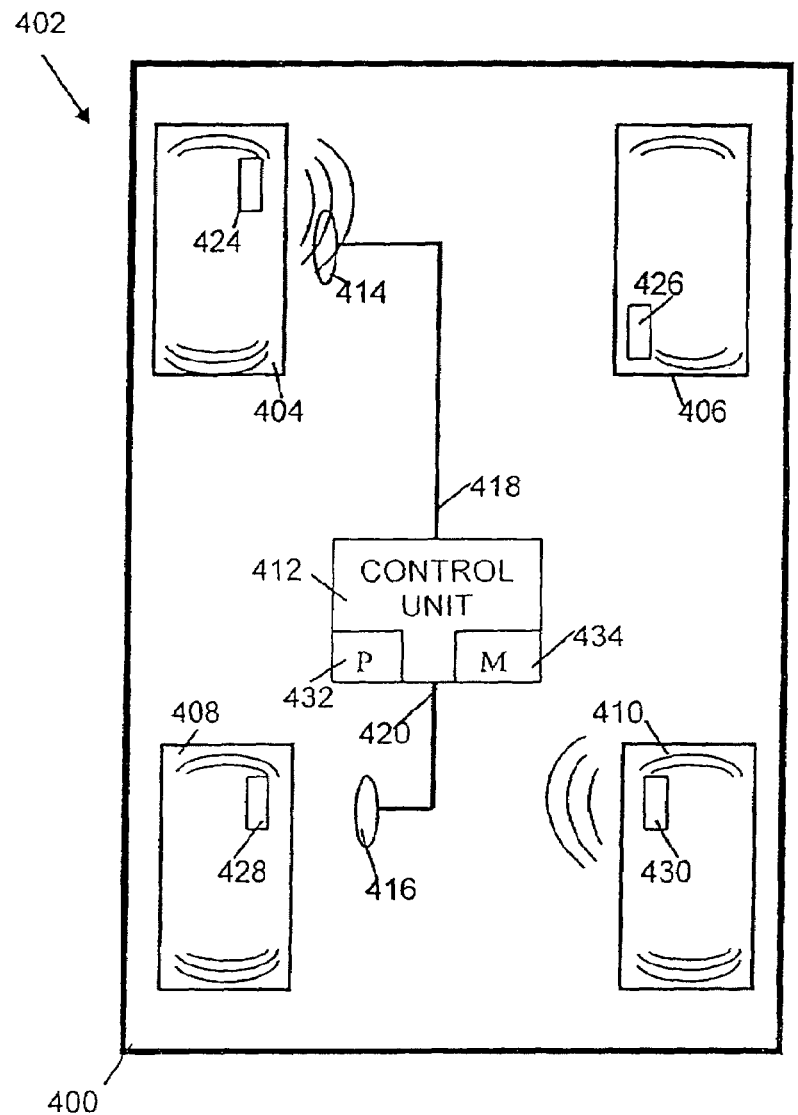
FIG. 4 is a block diagram of a vehicle with a remote tire monitor system using two RF (Radio Frequency) detectors.

FIG. 4 is a block diagram of a vehicle 400 with a remote tire monitor system 402. In the exemplary embodiment of FIG. 4, the vehicle 402 includes wheels 404, 406, 408, 410. Each wheel includes a tire mounted on a rim. In other embodiments, the vehicle 400 may have other numbers of wheels. For example, in one particular embodiment, a truck has 18 wheels.

The remote tire monitor system 402 includes a control unit 412, a front detector 414 and a rear detector 416. The front detector 414 is electrically coupled to the control unit 412 by a cable 418. Similarly, the rear detector 416 is electrically coupled to the control unit 412 by a cable 420.

The remote tire monitor system 402 further includes a tire monitor associated with each wheel of the vehicle 400. Thus, a tire monitor 424 is associated with wheel 404; tire monitor 426 is associated with wheel 406; tire monitor 428 is associated with wheel 408; and tire monitor 430 is associated with wheel 410. The tire monitors are generally of the type described herein and are configured to detect a tire condition such as tire pressure and to occasionally transmit a transmission including tire data, such as tire pressure data and identification information uniquely identifying the respective tire monitor.

In the illustrated embodiment, the front detector 414 is positioned proximate the left front wheel 404. For example, the front detector 414 may be mounted in the wheel well adjacent the wheel 404. Similarly, the rear detector 416 is positioned near the left rear wheel 408, such as in the wheel well adjacent the wheel 408. With this mounting configuration, the front detector 414 is positioned to detect transmissions from the pair of tire monitors 424, 426 associated with the front wheels 404, 406. The front detector 414 is proximate the left front tire monitor 424 and distal the right front tire monitor 426. Similarly, the rear detector 416 is positioned to detect transmissions from the left rear tire monitor 428 and the right rear tire monitor 430. The rear detector 416 is positioned proximate the left rear tire monitor 428 and distal the right rear tire monitor 430.

The illustrated embodiment is exemplary only. In FIG. 4, the detectors 414, 416 are designated for detecting radio frequency transmissions from the front wheels 404, 406 and the rear wheels 408, 410, respectively. In alternate embodiments, the RF detectors 414, 416 may be positioned to detect RF transmissions from the left side wheels 404, 408 and the right side wheels 406, 410 respectively. Similarly, while in FIG. 4 the front detector 414 is positioned in proximity to the left front wheel 404, away from the right front wheel 406, this positioning may be reversed so that the front detector 414 is positioned near the right front wheel 406, such as in the left front wheel well. In the same way, the rear detector 416, shown in FIG. 4 in proximity to the left rear wheel 408, may be positioned in proximity to the right rear wheel 410. Actual positioning of the RF detectors 414, 416 is not important. Rather, the relative signal strength or frequency of reception of RF transmissions from tire monitors is what is measured by the detectors 414, 416 in conjunction with the control unit 412. It is important that each RF detector be positioned on one side or end of the car, away from the centerline, so that the relative signal strength or number of transmissions received by the RF detector from each of its associated pair of tire monitors can be determined.

The control unit 412 includes a receiver to receive radio frequency transmissions from tire monitors of the tire monitor system 402, a controller 432 and a memory device 434. The controller 432 forms a processing means and may be any suitable control device such as a microprocessor, microcontroller, application specific integrated circuit (ASIC) or logic device coupled together to perform the necessary functions described herein.

The memory device 434 forms a memory means for storing data and preferably is formed of semiconductor memory. In the illustrated embodiment, the memory device of the control unit 412 includes persistent memory or nonvolatile memory such as an $E^2PROM$, and working memory such as random access memory (RAM). For example, the persistent memory may be used to stored tire identifiers and pressure data over extended periods of time, such as when the vehicle 400 is parked. The RAM may be organized as an array which stores counter values associated with tire monitor identifiers and tire monitor positions, as will be described in greater detail below.

Figure 5:
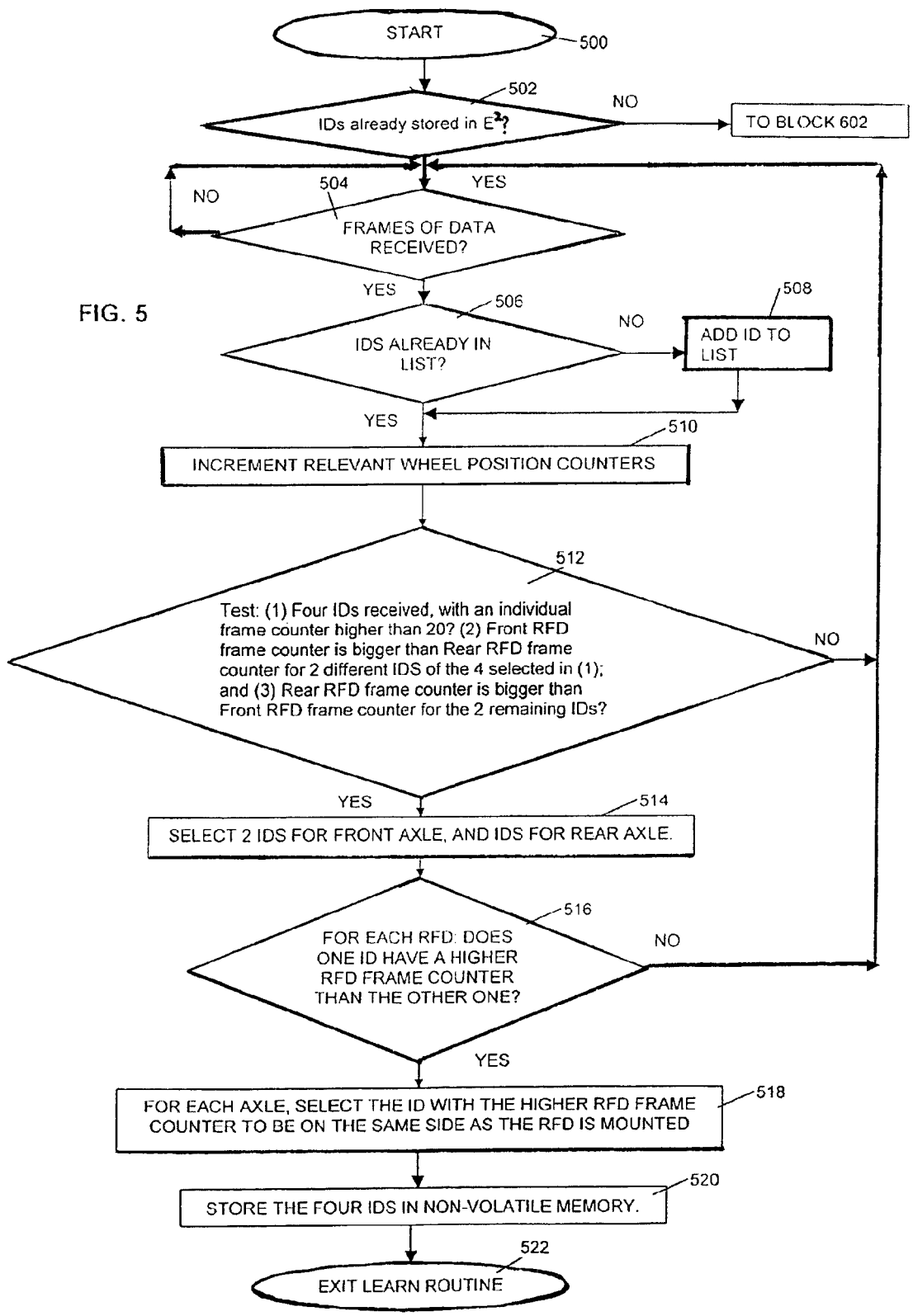
FIGS. 5 and 6 and are a flow diagram illustrating one embodiment of a remote tire monitor system.

FIG. 5 is a flow diagram illustrating operation of one embodiment of a remote tire monitor system. The method illustrated in FIG. 5 may be used in conjunction with a remote tire monitor system of the type illustrated in FIG. 4. The method embodiment in FIG. 5 allows a control unit of such a system to automatically learn the positions of the tire monitors of the system on the vehicle, referred to as a learn method or learn routine. This determination is made after receiving several transmitted frames of tire data from the respective tire monitors of the system. The control unit establishes an array of data in working memory and uses the data of the array to determine the position information for each tire monitor in the system. An example array of data is illustrated below.

|     | FrontRFD | Rear RFD | Total RF_FrameCounter |
| --- | --- | --- | --- |
| id1 | 22 | 2 | 22 |
| id2 | 12 | 4 | 23 |
| id3 | 2 | 20 | 20 |
| id4 | 1 | 10 | 20 |

In this example, rows of the array are defined by the identification information for each tire monitor from which data are received. In the example above, the identification information is listed as "id1," "id2," etc. However, in a more typical example, the identification information will be a numeric value forming a unique identifier or identification code of a transmitting tire monitor. The identification code is typically transmitted along with the tire pressure or other tire data by the tire monitor in a transmission frame. The exemplary array is shown with four rows, one for each tire monitor of the vehicle in this example. The array may also be formatted with additional rows to record data for additional transmitting tire monitors whose transmissions are received by the controller.

In the example array above, the columns of the array correspond to frame counter values which count the number of frames received at the respective RF detector of the system. Thus, in this example, a frame labeled with tire monitor identifier id1 has been received at the front RF detector 22 times. A frame with the same identifier id1 has been received at the rear RF detector two times, and so on. The count label TotalRF_FrameCounter is a count of the total number of frames received by the receiver of the controller from the identified tire monitor. The total frame counts recorded in this column is always greater than or equal to an RFD frame counter because the receiver has greater sensitivity than the RF detectors and detects transmissions that are missed by the RF detectors.

The method of FIG. 5 begins at block 500. The method of FIG. 5 shows the learn routine on the production line, when the tires of the vehicle are first assembled with the tire monitors and added to the remote tire monitor system. At block 502, it is determined if tire identifiers are already stored in electrically erasable ($E^2$) memory. This memory is nonvolatile or persistent memory which retains data stored therein even when power is removed from the memory. In the illustrated system, after installation on a vehicle, the persistent memory is empty. As soon as tire identifiers are received and verified according to the procedure of FIG. 5, the tire monitors are stored in the persistent memory. Thus, block 502 determines if this is the first time the tire monitor system has been operated after installation on a vehicle. If so, no tire monitor identifiers will be stored in the persistent memory and the "no" path will follow to block 602. If tire identifiers are already stored in the persistent memory, the "yes" path is followed to block 504.

At block 504, it is determined if a frame of data has been received. If not, control remains in a loop including block 504 until a frame of data have been received. As indicated above, each frame of data transmitted by a tire monitor typically includes data corresponding to the tire identifier which uniquely identifies the transmitting tire monitor and tire data, such as data corresponding to the measured tire pressure of the tire. Other information, such as a header or synchronization data may be transmitted as well.

Once a frame of data has been received at block 504, the tire monitor identifier contained in the frame of data is extracted and compared with other already-received identifiers stored in the list in working memory. If the extracted tire identifier is not present in the list, block 506, it is added to the list, block 508. Control then proceeds to block 510, where the relevant wheel position counters are incremented. As noted above, each identifier has three associated counters. One counter each is associated with each RF detector of the system and stores data corresponding to the number of transmissions detected by that respective RF detector. The third counter counts the total frames received from an identified tire monitor, and is incremented after a frame is received at the receiver of the controller. Thus, the relevant wheel position counters that are incremented at block 510 include the total RF frame counter and the frame counter corresponding to the front RF detector or the rear RF detector.

At block 512, a test is performed to determine if the specified criteria have been fulfilled. First, it is determined if four tire identifiers in the list have Total RF Frame counter values that are greater than a predetermined number, 20 in this example. That is, before applying the pass criteria, at least four tire identifier counters must have a value of 20 or greater. This test is implemented to ensure that there is a strong signal from a tire monitor and to eliminate any wrong or incorrect tire identifiers being added to the system. If the received signal from a tire monitor is weak, it will likely be received only a few times, rather than 20 or more times. Any other suitable number may be substituted for the predetermined number 20. Reducing the number will increase the speed at which the tire monitor positioning is learned by the system, but may increase the likelihood of incorrect tire monitor position learning.

According to the second criterion of the illustrated embodiment, the counter for the front RF detector must be larger than the counter for the rear RF detector for two different tire identifiers out of the four. According to the third criterion, it is determined if the the frame counter for the rear RF detector stores a value larger than the front RF detector frame counter for the two remaining tire identifiers in the list. If these criteria are not fulfilled using the tire identifiers in the list, control returns to the block 504 to await receipt of additional frame of data.

If these three criteria are fulfilled, however, at block 514, two tire identifiers are selected from the list for the front axle of the vehicle, according to the second criterion above, and two tire identifiers are selected from the list for the rear axle, according to the third criterion above. Thus, at block 518, the method has chosen four tire identifiers with a total RF frame counter value higher than 20 and has distinguished the selected tire identifiers between the front of the vehicle and the rear of the vehicle by using the front frame counter value and rear frame counter value. For example, using the values shown in the example list above, the tire identifiers corresponding to the tire monitors positioned at the front of a vehicle are tire identifiers id1 and id2. The tire identifiers corresponding to tire monitors positioned at the rear of the vehicle are id3 and id4.

Beginning at block 516, the method identifies the right and left tire monitor for each axle. First it is determined if, among the identified tire identifiers from the list for each of the front and rear axles, one RF detector counter value has a higher frame counter value than the other. If not, the method cannot distinguish the two tire monitors on the axle. Control returns to block 504 to await receipt of additional frames of data. If the criterion of block 516 is met, at block 518 the tire indicator with the higher RF detector frame counter value is selected to be on the same side of the vehicle as the RF detector for that end of the vehicle. Thus, in FIG. 4, among the front wheels 404, 406, the tire identifier associated with the larger valued RF detector counter is selected to correspond to tire monitor 426. Similarly, the tire identifier having the lower valued RF detector counter value is selected to be associated with the tire monitor 424. Alternatively, if, as is suggested in FIG. 5, those RF detectors 414 and 416 are positioned on the left side of the vehicle 400, then of the tires of tire identifier selected at block 514, the larger valued RF detector frame counter is associated with the left-hand side tire monitor for both axles. In the illustration of FIG. 4, if the RF detector 414 were instead mounted on the left-hand side of the vehicle 400, the larger valued tire identifier would be selected to be associated with tire monitor 424 and the larger valued RF detector frame counter would be selected to be associated with tire monitor 428. Using the example list of data above, and assuming that both tire monitors are on the left-hand side of the vehicle, the method would select id1 for the left front tire monitor and id2 for the right front tire monitor. Similarly, the method would select id3 for the left rear tire monitor and id4 for the right rear tire monitor.

At block 520, the four selected tire identifiers are stored in non-volatile memory such as the $E^2$PROM or other persistent memory described above. During subsequent operation of the tire monitor system, as new frames of tire data are received, the tire identification information contained in the frame will be compared with one of the selected in store for tire identifiers. If there is a match, the tire pressure information or other tire data contained in the frame will be used to update the current tire pressure information. At block 522, the learn routine illustrated in FIG. 5 is exited and the method of FIG. 5 terminates.

Figure 6:
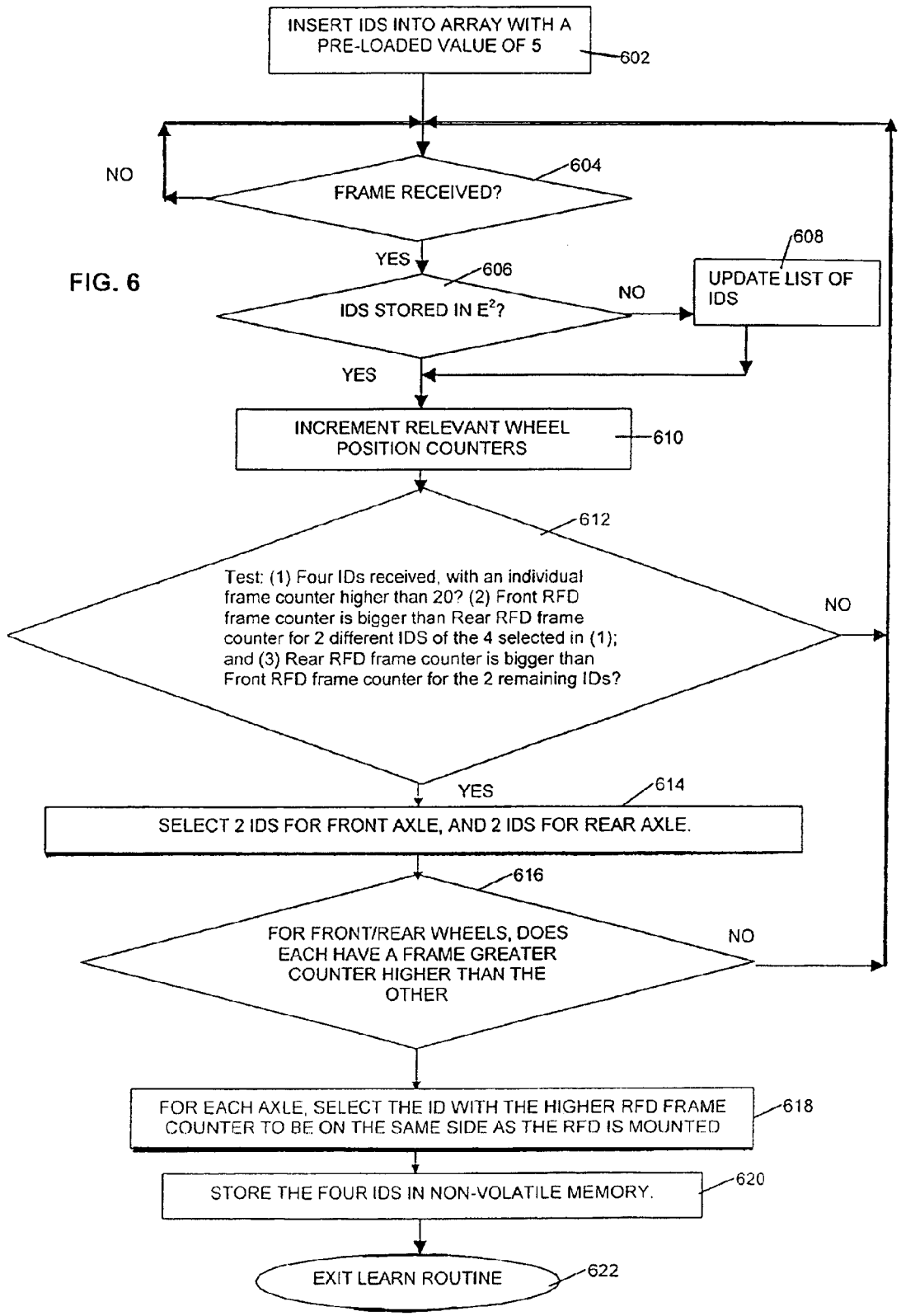

FIG. 6 illustrates a method for the remote tire monitor system to learn the positioning of tire monitors on a vehicle during a normal driving operation. The method begins at block 602, which is accessed after determining at block 502 (FIG. 5) that tire monitor identifiers have already been stored in the persistent memory of the system.

At block 602, the tire monitor values stored in the persistent memory are inserted into the list or array in working memory. The Total RF Frame Counter, the front RF detector counter value (for identifiers which were in the front) and the rear RF detector counter value (for identifiers which were in the rear) for each of these array entries is preloaded with a predetermined value, such as 5. Storing preloaded values such as this gives a weighting to the tire identifiers already stored in the persistent memory and copied into the working memory array. The benefit of weighting the preloaded tire monitor values in the array in this manner is to reduce the likelihood that a tire monitor on an adjacent vehicle will be detected and selected as one of the four tire monitors of the vehicle. This could occur, for example, if more than one vehicle with comparable systems are parked adjacent each other, such as the end of an assembly line or in another location. Further, weighting the preloaded tire monitor values reduces the time required for the learn process so that reliable information can be given to the driver sooner. This process happens every time the vehicle is started and a new journey is begun.

At block 604, it is determined if a frame of data has been received. If not, control remains in a loop including block 604 until a frame of data is received. Once a frame of data has been received, control proceeds to block 606.

At block 606 it is determined if the tire monitor identifier contained in the received frame is already stored in the persistent memory or $E^2$PROM. If not, at block 608 the received tire monitor identifier is added to the working list of tire identifiers in working memory. Control proceeds to block 610.

At block 610, the relevant wheel position counters are incremented. Operation here is similar to the operation at block 510, FIG. 5. The working list of data includes columns for each of the front and rear RF detector counters and a total RF frame counter. At block 610, the total RF frame counter corresponding to the received tire identifier is incremented. Also at block 610, the counter corresponding to the front or rear RF detector is incremented, depending on which RF detector sensed or detected the transmission from the transmitting tire monitor.

At block 612, three criteria are tested to determine if sufficient frames of data have been received to reliably distinguish front from rear tire monitor positions. Operation of block 612 is similar to the operation of block 512, FIG. 5. At block 614, two tire identifiers are selected to correspond to the front end of the vehicle and two tire identifiers are selected to correspond to the rear end of the vehicle. At block 612, if all three criteria are not fulfilled, control returns to block 604 to await the receipt of additional frames of data.

At block 616, it is determined if, for each of the front and rear sets of tire monitors, one tire monitor has a higher RF detector counter value. If not, control returns to block 604 to await the receipt of additional data. If so, at block 618, the front and rear selected tire monitor pairs are each sorted among right and left tire monitors, selecting a left front, right front, left rear and right rear tire monitor. At block 620, the four tire monitor identifiers are stored in non-volatile or persistent memory, along with position information for the tire monitor. The learn routine of FIG. 6 is then exited at 622.

From the foregoing, it can be seen that the present embodiments provide a method and apparatus which automatically conveys wheel position and data to a receiver in a vehicle.

Even after changes in tire position due to tire rotation or replacement of a tire, the system automatically re-learns the position of the tires on the vehicle. No external actuation is required. Interference and cross talk are minimized by locating RF detectors in close proximity to the tire monitors. By sharing one RF detector between the front wheels and one RF detector between the rear wheels, the required number of RF detectors is reduced along with the required cabling and the concomitant cost, weight and difficulty of installation of the system. Further, the system provides automatic learn capability for learning and updating the identities of tire monitors on the vehicle without manual intervention.

While a particular embodiment of the present invention has been shown and described, modifications may be made. For example, while the exemplary embodiment counts received transmissions from tire monitors of the system, other embodiments may use alternate methods or detect other signal parameters to identify tire monitor positions in the system. Also, while the two learn methods of FIGS. 5 and 6 are generally similarly for both the learn method in the production line and the learn method during normal driving, other method steps or test criteria may be substituted to change the two methods, accounting for the differing environments in which each method is practiced. It is therefore intended in the appended claims to cover all such changes and modifications which fall within the true spirit and scope of the invention.

In addition to the left/right determination described in conjunction with FIGS. 5 and 6, various other left/right determinations are possible. In one embodiment, the remote tire monitor system 402 may be configured to detect the relative signal strength received by the RF detectors 414, 416. In other embodiment, the control unit 412 may be configured to detect the relative signal strength received by the RF receiver.

Figure 7:
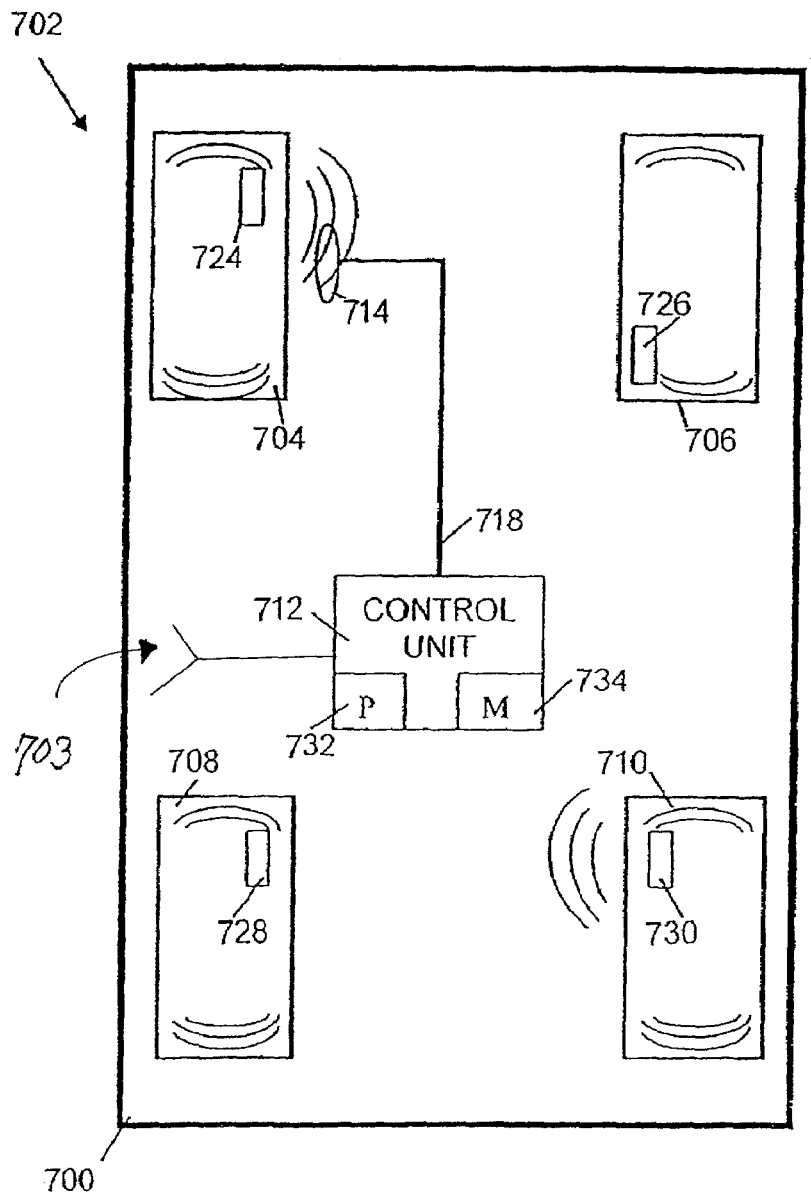
FIG. 7 is a block diagram of a vehicle with a remote tire monitor system using a single front RF detector.

FIG. 7 is a block diagram of a vehicle 700 with a remote tire monitor system 702. In the exemplary embodiment of FIG. 7, the vehicle 700 includes four wheels 704, 706, 708, 710. In other embodiments, the vehicle 700 may have other numbers of wheels. The remote tire monitor system 702 includes a front RF detector 714. The configuration of the remote tire monitor system 702 is not limited thereto, and various other configurations such as a single rear RF detector, a single left RF detector and a single right RF detector are possible. The remote tire monitor system 702 includes a tire monitor associated with each wheel of the vehicle 700. Specifically, a tire monitor 724 is associated with a wheel 704; tire monitor 726 is associated with a wheel 706; tire monitor 728 is associated with a wheel 708; and tire monitor 730 is associated with a wheel 710.

The remote tire monitor system 702 includes a control unit 712. The control unit 712 includes an RF receiver such as the RF receiver 120 of FIG. 1. In other embodiments, the RF receiver may include a received signal strength indicator circuit. The front detector 714 is electrically coupled to the control unit 712 by a cable 718. The cable 718 may use one of the power lines distributed in the vehicle 700. The front detector 714 is positioned proximate the left front wheel 704. For example, the front detector 714 may be mounted in the wheel well adjacent the wheel 704. While the front detector 714 is positioned in proximity to the left front wheel 704, away from the right front wheel 706, this positioning may be changed so that the front detector 714 is positioned near the right front wheel 706, such as in the right front wheel well in other embodiments.

With this mounting configuration, the front detector 714 is positioned to detect transmissions from the pair of tire monitors 724, 726 associated with the front wheels 704, 706. Alternatively, or additionally, the front detector 714 also may be operable to detect transmission from the pair of tire monitors 728, 730 associated with the rear wheels 708, 710.

Using the front detector 714, the remote tire monitor system 702 operates as follows. When any tire monitor transmits data by emitting an RF transmission, the front detector 714 detects the burst of RF energy. The front detector 714 responds to the RF energy by modulating the signal on the cable 718 to the control unit 712 with the envelope of the transmitted data as described above in conjunction with FIG. 1. The control unit 712 detects this modulation as transmission indications.

Based on the detected modulations, the control unit 712 determines front and rear position information. Because the front detector 714 is positioned proximate the front tire monitors 724, 726 and distal from the rear tire monitors 728, 730, the front detector 714 may receive the RF transmissions from the rear tire monitors 728, 730 less frequently than the front tire monitors 724, 726. As a result, the control unit 712 detects a smaller number of modulations from the rear tire monitors 728, 730 than that from the front tire monitors 724, 726. By counting the detected modulations, the control unit 712 may assign identifiers with a greater number of detected modulations to front wheels. Conversely, the control unit 712 may assign identifiers with a smaller number of detected modulations to rear wheels.

Figure 8:
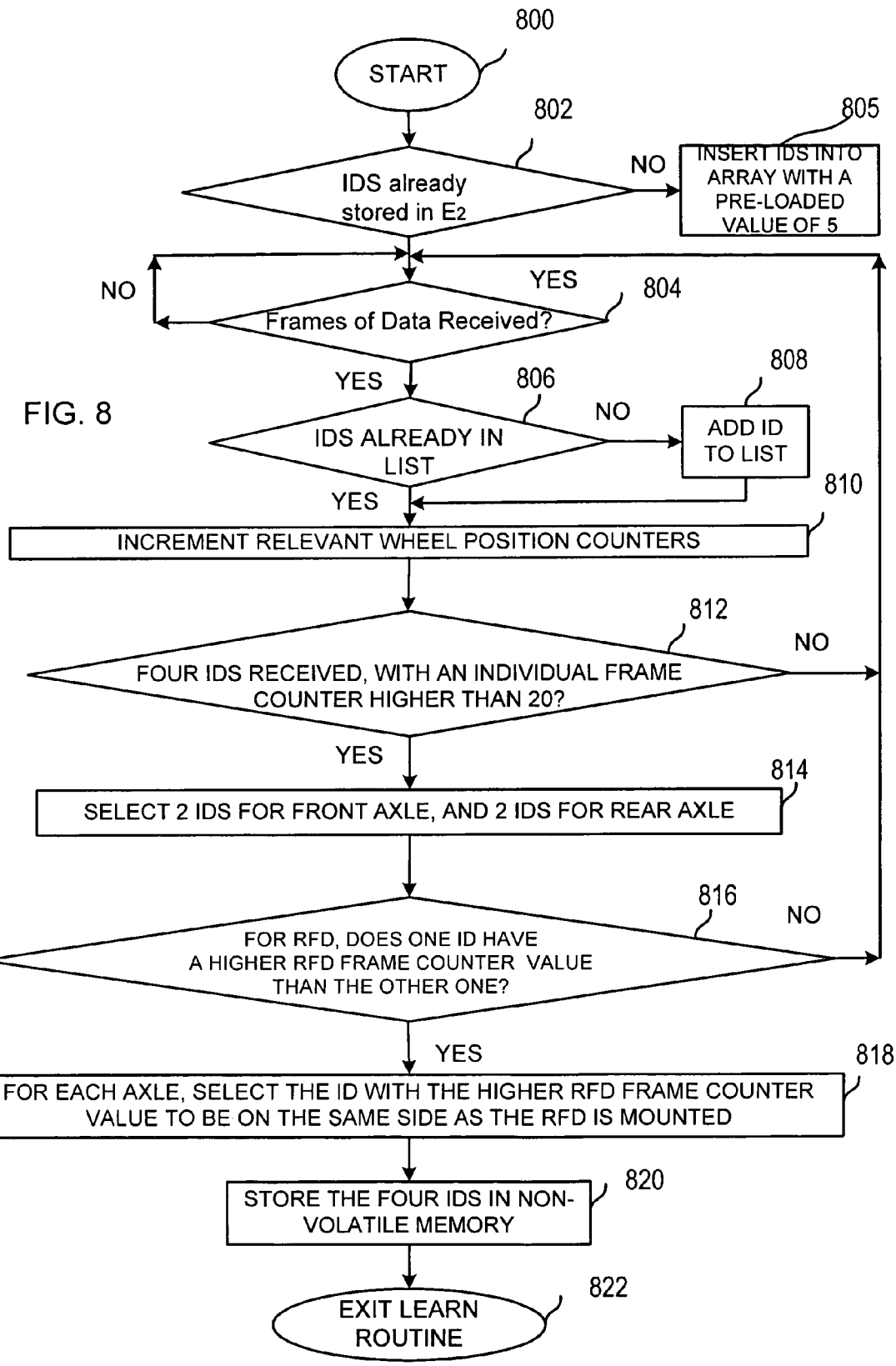
FIG. 8 is a flowchart illustrating a first example operation of the remote tire monitor system using the front RF detector.

FIG. 8 is a flowchart illustrating one embodiment of a method for determining position information of the remote tire monitor system 702 during an auto learn mode. The operation of the remote tire monitor system 702 is described only for convenience of discussion and various other remote tire monitor systems are possible. Blocks 800 to 810 may be substantially similar to the blocks 500-510 of FIG. 2. At blocks 800 to 810, the control unit 712 receives a number of frames of data from the tire monitors 724-730 and extracts identifiers from the data. The control unit 712 performs an auto learn mode as described in conjunction with FIGS. 2 and 5. After performing an auto learn mode for the remote tire monitor systems 702, the control unit 712 automatically learns the positions of the tire monitors of the system on the vehicle. The control unit 712 establishes an array of data in working memory 734. The data of the array includes identifiers of each tire monitor and count values of the detected modulations. Unlike the remote tire monitor 402 of FIG. 4, the remote tire monitor 702 may use two position counters associated with each identifier. One counter is associated with the front RF detector 714, and the other counter is associated with counting the total frames received from an identified tire monitor. This total frames may be received by the receiver of the control unit 712 having a higher level of sensitivity. By way of example only, the memory 734 may store the array of data as follows.

|     | FrontRFD | Total RF_FrameCounter |
| --- | --- | --- |
| id1 | 22 | 22 |
| id2 | 12 | 23 |
| id3 | 6 | 20 |
| Id4 | 1 | 20 |

At block 812, a test is performed to determine if four tire identifiers in the list have Total RF Frame counter values that are greater than a predetermined number, for example, 20. The fulfillment of this test indicates that there is a strong signal from each tire monitor, which reduces possible errors based on weak signals. If this test is fulfilled, counter values of four tire monitors are compared to determine position information at block 814. The control unit 712 compares the counter values of the four identifiers and selects two identifiers for a front axle and the other two identifiers for a rear axle at block 814. Due to the location of the RF detector 714, the two identifiers for the front axle have higher counter values than those for the rear axle. The control unit 712 has default setting information of the RF detector configuration such as left front location of a single RF detector. Thus, the control unit 712 assigns the two identifiers having the higher counter values to the front axle. The other two identifiers are assigned to the rear axle. In the foregoing example array, the control unit 712 selects the identifiers id1 and id2 for the front axle and the identifiers id3 and id4 for the rear axle. At block 816, the two identifiers id1 and id2 for the front axle are compared and the identifiers id3 and id4 for the rear axle are compared, respectively. At block 818, for each axle, the identifier with the higher counter value is determined to be the same side as the side where the RF detector is mounted. Specifically, the identifier id1 is determined to be the left side and the identifier id2 the right side. Likewise, the id3 is determined to be the left side and the id4 the right side.

At block 820, the four identifiers id1-id4 are stored in the memory 734. As a result, the control unit 712 is able to automatically determine the position information of the four tire monitors 724-730 with the single RF detector 714. It is important to position the RF detector 714 off-center, i.e., proximate the left side or the right side to distinguish the left position from the right position.

In another embodiment, to improve accuracy of the position determination, the control unit 712 may store configuration information of the RF detector 714 and the tire monitors 724-730. As noted above, it may be programmed to store the setting of the RF detector 714, i.e., the front left location. Further, the control unit 712 may store information concerning each distance between the RF detector 714 and each tire monitor 724-730, d1, d2, d3 and d4. The control unit 712 may or may not use the information d1~d4. When there is a substantial difference among the counter values of the identifiers, the control unit 712 may not use the distance information d1~d4 for determining the position. However, if the difference between the counter values is small, the control unit 712 may retrieve the stored distance information and determine the position based on the counter values and the distance information. For example, in the remote tire monitor system 702 of FIG. 7, the distance information d1~d4 has the relationship of d4>d3>d2>d1. The counter values may be inverse-proportional to the distances d1~d4. With the distance information, the accuracy of the system operation may substantially improve. This has a particular advantage for a remote tire monitor system with more than four wheels. For example, trucks having two front wheels disposed adjacent each other on each side and/or a center wheel between a front wheel and a rear wheel may rely on the distance information to improve accuracy of the position determination.

The remote tire monitor system 702 described above operates such that the RF detector 714 receives the RF transmissions from the rear tire monitors 728, 730. In other embodiment, the front RF detector 714 may not receive the RF transmissions from the rear tire monitors 728, 730. As noted above, the front detector 714 may be an inexpensive, small RF detector to minimize expenses for implementing the tire monitor system 702. The front detector 714 may not be sensitive enough to detect the RF transmissions from the rear tire monitors 728, 730. Alternatively, or additionally, the vehicle 700 may have a long body with a substantial distance between the front wheels and the rear wheels such as limousine, trailers and trucks. In those cases, the front detector 714 may not detect the RF transmission when the rear tire monitors 728, 730 transmit the RF transmission. The control unit 712 also detects no modulation that results from the RF transmission of the rear tire monitors 728, 730. The control unit 712 assigns identifiers with any detected modulations to front wheels, whereas it assigns identifiers with no detection to rear wheels. As a result, the control unit 712 is able to determine front and rear position information with the single RF detector 714.

Where the RF detector 714 detects the RF transmissions only from the front tire monitors 724, 726, the control unit 712 performs an auto learn mode and establishes an array of the four identifiers id1~id4. Two counters may be used to count the total frames received from the identified tire monitors. By way of example, the array of the identifiers may be illustrated as follows.

|     | FrontRFD | Total RF_FrameCounter |
| --- | --- | --- |
| id1 | 22 | 22 |
| id2 | 19 | 23 |
| id3 | 0  | 20 |
| id4 | 0  | 20 |

The control unit 712 may use data of the array to determine front and rear position information of the remote tire monitor system 702. If the control unit 712 detects no modulation, it may select and assign two identifiers id3 and id4 to the rear tire monitors 728, 730.

After determining the front and rear position, the left and right position information needs determination to complete the automatic recognition of the tire monitor positioning. For the rear tire monitors 728, 730, the control unit 712 may not use the data of the array because of no detection of the RF transmissions. For the front tire monitors 724, 726, the control unit 712 may not again use the data of the array because the difference in the counter values may be unrecognizable or small so that it may cause erroneous determination of the position. As a result, the control unit 712 may not be able to determine the left/right position based on the counter values. Alternatively, or additionally, when the front detector 714 receives the RF transmission from the rear tire monitors 728, 730 as described above, accurate left versus right determination may not be made based on comparison of the counter values. For example, the counter values may have only minor differences.

Various methods for determining the left and right position information are available. For example, the determination of the left and right position is made based on a received signal strength, acceleration, phase differences, tire pressure changes, etc. Other known methods are possible. These methods are combined with the front/rear determination method using the single RF detector to complete the automatic location of the tire monitor positioning.

Figure 9:
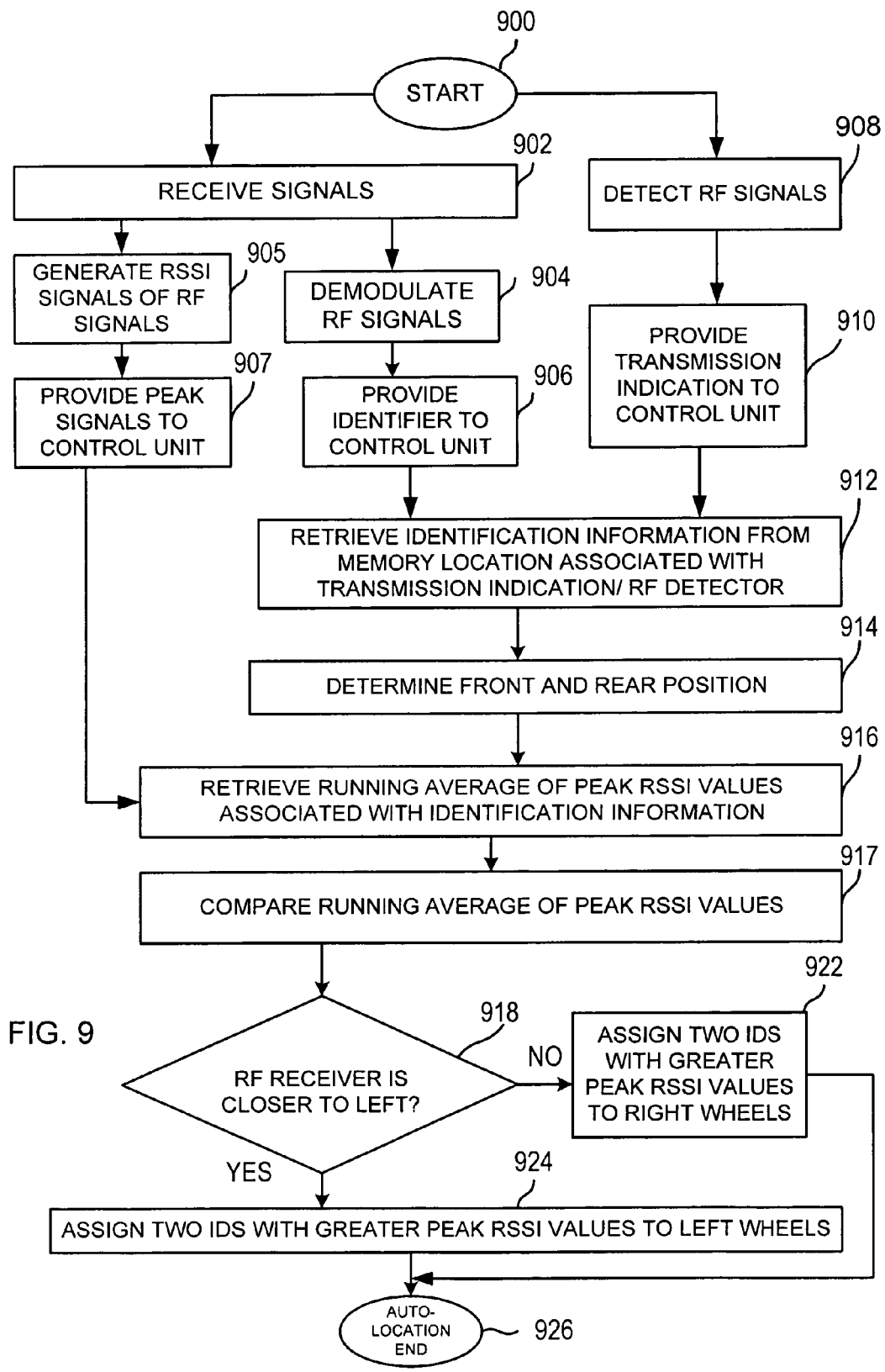
FIG. 9 is a flowchart illustrating a second example operation of the remote tire monitor system using the front RF detector.

FIG. 9 is a flowchart illustrating operations of the remote tire monitor system 702, which determines the left and right position information based on a received signal strength. When the tire monitors 724, 726, 728, 730 transmit signals, the RF receiver and/or the RF detector 714 may receive the signals at blocks 902 and 908. The RF receiver demodulate the RF signals to extract the tire monitor identifiers at block 904 and provides the identifiers to the control unit 712 at block 906. The RF detector 714 detects RF transmissions and modulates the cable 718 with the envelop at block 910. The control unit 712 associates the identifiers with detected modulation generated by the RF detector at block 912. For example, the control unit 712 may count a number of detected modulations and establish an array of the identifiers and the number of detected modulations. At block 914, the control unit 712 determines the front and rear position information based on the number of detected modulations. Specifically, the control unit 712 operates such that the two identifiers with the greater number of detected modulations are assigned to front wheels and front tire monitors 724, 726.

In addition to demodulation of the received RF signals, the RF receiver is operable to generate a received signal strength indicator ("RSSI") signal. For this reason, the RF receiver may include an RSSI circuit and demodulating and decoding circuitry to extract the identifiers. The RSSI circuit generates the RSSI signal of the RF signals received at the RF receiver at block 905. Various other RSSI circuits are possible as long as they detect the relative signal strength from tire monitors. The RSSI circuit provides an RSSI signal to other circuits such as a signal detector circuit. The signal detector circuit may include a peak detector, a droop detector or a negative peak detector, etc. By way of example, the RF receiver includes a peak detector which is operated at block 907. The peak detector outputs a peak received signal strength signal to a processor 732 of the control unit 712. The detailed description on the peak detector is provided in the copending application Ser. No. 10/125,043, which is incorporated herein by reference in its entirety. In one embodiment, the processor 732 may operate such that it develops a running average of the peak RSSI values for each wheel. At block 916, the control unit 712 retrieves the running average of the peak RSSI values associated with the identifiers of the tire monitors 724, 726, 728, 730. At block 917, the control unit 712 compares the running average of the peak RSSI values and determines two identifiers with greater RSSI values.

At the next block 918, the control unit 712 determines whether the RF receiver and/or antenna 703 are positioned closer to the left wheels of the vehicle. Upon determination that the RF receiver and/or antenna 703 are positioned closer to the left wheels, the control unit 712 assigns two identifiers with the greater peak RSSI values to left wheels at block 924. In other embodiment, the location of the RF receiver and/or antenna may be preprogrammed in the control unit 712. If the RF receiver and/or antenna are not positioned closer to the left wheels, the two identifiers with greater peak RSSI values to the right wheels at block 922. At blocks 922 and 924, the control unit 712 completes the determination of the front left and the rear left wheels as well as the rear left and the rear right wheels. At block 926, auto-location of the four tire monitors 724, 726, 728, 730 is completed.

Alternatively, or additionally, the RSSI circuit of the RF receiver may further permit the control unit 712 to determine additional position information. For example, if the RF detector 714 does not properly operate, the control unit 712 may not receive any RF transmissions from the RF detector 714. For example, the array of the identifier in the working memory 734 may be illustrated as follows.

|  | FrontRFD | Total RF_FrameCounter |
|---|---|---|
| Id1 | 2 | 22 |
| Id2 | 1 | 23 |
| Id3 | 0 | 20 |
| Id4 | 0 | 20 |

Because the Total RF_FrameCounter exceeds a predetermined threshold, for example, 20, the control unit 712 is able to determine that the tire monitors 724-730 are transmitting tire data and properly working. For the same reason, the control unit 712 is able to determine that the RF detector 714 is not properly operating. The control unit 712 may have established another array of identifiers with the relative signal strength. For example, the control unit 712 may increment a counter value for each identifier each time the greatest RSSI value is received with that identifier. Based on such counter values, the control unit 712 may determine position information of the tire monitors. In FIG. 7, the RF receiver and/or antenna 703 are positioned closer to the left rear tire monitor 726. The control unit 712 assigns the identifier with the largest counter value to the left rear tire monitor 726, the second largest counter value to the left front tire monitor, and the smallest counter value to the right front tire monitor. This is possible because the RF receiver has a greater sensitivity than that of the RF detector 714.

In other embodiment, to determine left and right tire position, an acceleration signal from an acceleration sensor may be used. When a tire rotates, tire monitors experience two types of acceleration, centrifugal acceleration and tangential acceleration. The centrifugal acceleration is dependent upon the maximum vehicle speed. The tangential acceleration experienced by the tire monitor develops at the periphery of rotating tires. The centrifugal acceleration and the tangential accelerations generate along two orthogonal axes.

Each tire monitor includes an acceleration sensor to detect acceleration values. The acceleration values include the polarity of the tangential acceleration, phase difference between two types of acceleration, etc. The acceleration sensor may be a dual-axis sensor or a tri-axis sensor, which detects the acceleration values developing along two axes or three axes. The acceleration sensor generates signals representing the acceleration values. In one embodiment, the acceleration sensor detects the polarity of the tangential acceleration and generates a signal representing the polarity. The wheels on the left side and the right side of the vehicle are normally configured to rotate in opposite directions. As a result, the tire monitors on the left side and the right side of a vehicle experience the tangential acceleration that is oppositely directed. For example, the left tire monitors 724, 728 and the right tire monitors 726, 730 transmit the acceleration signals representing the opposite polarity to the control unit 712. Further detailed information on the tangential acceleration data for use with the remote tire monitor system is found in U.S. Pat. No. 6,204,758 to Wacker et al., which is in its entirety incorporated herein by reference.

Figure 10:
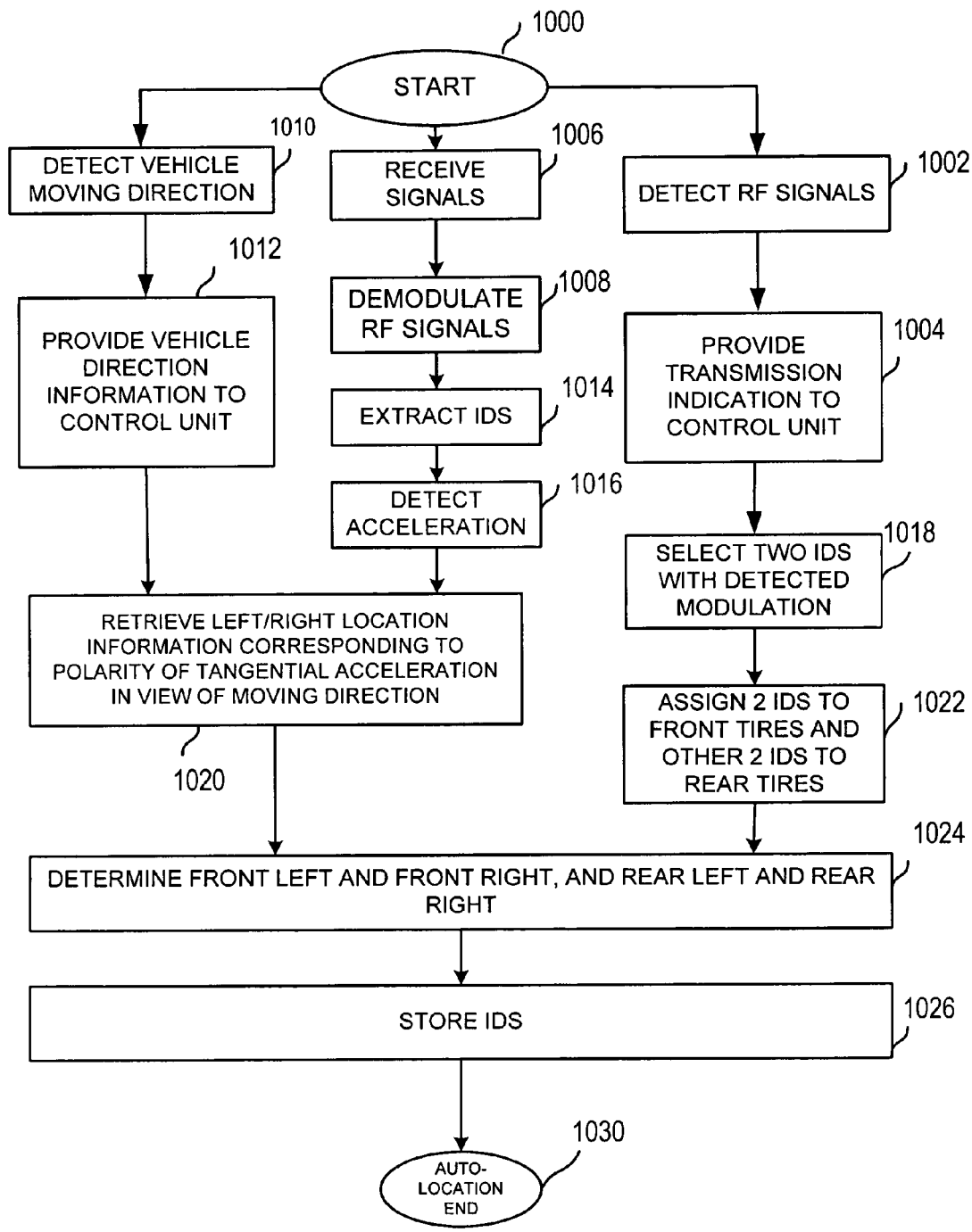
FIG. 10 is a flowchart illustrating a third example operation of the remote tire monitor system using the front RF detector.

FIG. 10 is a flowchart illustrating an operation of the remote tire monitor system 702 for determining left and right position information using the polarity of the acceleration. One of the tire monitors 724~730 transmits tire information signals received by the front detector 714 and the control unit 712. The front detector 714 detects RF signals at block 1002 and provides transmission indications to the control unit 712 at block 1004. The control unit 712 receives RF signals at block 1006 and demodulates the signals at block 1008. The control unit 712 extracts the identifiers from the received signal at block 1014. At block 1010, the control unit 712 is provided with a vehicle moving direction detected by using other sensors, gear mechanism or any other suitable devices.

At block 1018, the control unit 712 selects two identifiers having the detected modulations as transmission indications. As described above, the control unit 712 does not detect any modulation from the rear tire monitors because the front detector 714 does not detect any RF transmission. The control unit 712 assigns the two identifiers to the front tires and remaining two identifiers to the rear tires at block 1022. At block 1016, the control unit 712 operates to detect the polarity of the tangential acceleration from the received RF signals. At block 1020, the control unit 712 retrieves left or right position information corresponding to the polarity of the tangential acceleration. The control unit 712 further takes into account the vehicle moving direction because the wheel rotation direction differs as the vehicle moves forward or rearward. The polarity of the tangential acceleration directly relates to the wheel rotation direction. At block 1024, the control unit 712 determines front left and front right positions, and rear left and rear right positions. The identifiers are stored with the location information at block 1026.

In another embodiment, the acceleration sensor detects relationship of two types of acceleration and generates a resulting signal. The acceleration sensor may be a dual-axis sensor and detect the centrifugal acceleration and the tangential acceleration along two orthogonal axes. Depending on the rotation direction of the wheels, i.e., clockwise or counter-clockwise, a signal for the centrifugal acceleration and a signal for the tangential acceleration may develop phase difference. For this purpose, the acceleration sensor may generate the resulting signal in a sine wave form. The sine wave output signal may describe acceleration due to gravity plus centrifugal or tangential acceleration components. As noted above, the tires on the left side and the right side rotate in the opposite directions. For example, the tires on the left side rotate in a clockwise direction, whereas the tires on the right side rotate in a counterclockwise direction. Depending on the direction of the rotation of the wheel, two sine waveforms produced by the acceleration sensors are out of phase and one axis will lead or lag the other axis. For example, if a tire on the left side rotates in a counterclockwise direction, acceleration along the z axis may lead acceleration along the x axis by 90 degrees. Conversely, a tire on the right side rotates in a clockwise direction and acceleration along the z axis may lag acceleration along the x axis by 90 degrees. Further detailed description on the acceleration sensor and the lead/lag information is found in the copending application Ser. No. 10/125, 043, which is incorporated herein by reference in its entirety.

This lead/lag relationship, combined with the rotation direction, enables the control unit 712 to determine left versus right position information. The operation of the remote tire monitor system 702 is substantially similar to the operation described in connection with FIG. 10. The control unit 712 receives the detected modulations as transmission indications from the RF detector 714 and receives RF signals from the receiver. The control unit 712 associates the identifiers with a number of detected modulations and determines front versus rear position based on the number of detected modulations. The control unit 712 detects a vehicle moving direction and acceleration values representing phase difference of the tangential acceleration and the centrifugal acceleration. The left and right position information corresponding to phase difference of two types of acceleration signals may be preprogrammed. Specifically, when the vehicle moves forward, the left wheel rotates in a clockwise direction and the right wheel rotates in a counter-clockwise direction. For the left wheel, acceleration along the z axis may lag acceleration along the x axis by 90 degrees, and for the right wheel, acceleration along the z axis may lead acceleration along the x axis by 90 degrees. The acceleration sensors detect this phase difference from the left wheels and the right wheels and transmit it to the control unit 712. Based on the vehicle moving direction, the control unit 714 is able to determine the rotation direction of the left wheels and the right wheels. Then, the control unit 712 associates the left and right position with the acceleration signal representing the acceleration values. As a result, an auto-location of four corners of the vehicle is completed.

The remote tire monitor system 702 and its operations are described above, but various other systems are possible. Instead of the front RF detector 714, a rear RF detector, a left RF detector or a right RF detector may be used. The rear RF detector may be positioned to be proximate a rear axle.

The left or right RF detector may be positioned to be proximate left and right sides of the vehicle, respectively. For instance, a remote tire monitor system having a right RF detector for use with a four-wheel vehicle operates as follows. The right RF detector may be positioned proximate rear tire monitors, in particular, a rear right tire monitor. The control unit may first determine left and right position information by comparing counter values of four identifiers. Two identifiers with higher counter values than the other two may be assigned to right tire monitors. The other two identifiers may be assigned to left tire monitors. In addition, because the right RF detector is positioned proximate a rear axle, the control unit may determine front versus rear position information. Between the two identifiers assigned to the right tire monitors, the identifier with a higher counter value may be associated with the rear right tire monitor. The other identifier is associated with the rear left tire monitor. In the same way, the other two identifiers may be associated with the left front and left rear tire monitors.

In other embodiment, the right RF detector is positioned off-center, i.e., proximate the right side of the vehicle and midway between the front axle and the rear axle. As noted above, the control unit is able to determine right versus left position information with the detected transmissions indications. Other method of determining front versus rear position information is needed because the RF detector is not proximate both the front axle and the rear axle. The RSSI signal or acceleration signals described above may be used to determine the front versus rear position.

From the foregoing, it can be seen that the embodiments present a method and apparatus which automatically conveys wheel position and data to a receiver in a vehicle. The remote tire monitor system employs a single RF detector to generate a transmission indication upon detection of each RF transmission from the tire monitors. With the single RF detector, the system control unit may determine position information such as front versus rear and/or left versus right. The system control unit may use the signal strength of the transmission to determine the remainder of the position information after determining front versus rear or left versus right. Further, the system control unit may use the signal strength of the transmission to determine the entire position information. This feature is particularly suitable if the RF detector does not properly operate. Even after changes in tire position due to tire rotation or replacement of a tire, the system automatically re-learns the position of the tires on the vehicle.

A single, inexpensive RF detector is needed to identify position of tire monitors associated with each tire. The single RF detector operates to determine position information, regardless of size and type of a vehicle. The use of the RF receiver in addition to the RF detector further improves accuracy and efficiency of system operation. Upon malfunction of the RF detector, the RF receiver including the RSSI circuit may serve as a supplemental means to determine position information.

It is therefore intended that the foregoing detailed description be regarded as illustrative rather than limiting, and that it be understood that it is the following claims, including all equivalents, that are intended to define the spirit and scope of this invention.

The invention claimed is:

1. A remote tire monitor system, comprising:
a plurality of tire monitors associated with wheels of a vehicle and operable to transmit tire information;
a single radio frequency (RF) detector operable to detect a RF transmission from two or more tire monitors and produce a detected transmission indication;
a central receiver operable to receive the tire information independently of the single RF detector; and
a control unit coupled with the RF detector and the receiver, the control unit operable to determine positions of the plurality of tire monitors based on the detected transmission indication from the single RF detector and the received tire information from the receiver;
wherein the single RF detector is arranged to be remotely coupled to the control unit and is arranged proximate one of a front tire set and a back tire set and one of a left tire set and a right tire set;
wherein the control unit is operable to count the detected transmission indication and compare count values of the received detected transmission indication for the plurality of tire monitors, and the control unit determines left versus right position and front versus rear position for the plurality of tire monitors.

2. The remote tire system of claim 1, wherein the control unit first associates the plurality of tire monitors with front versus rear position based on the count values.

3. The remote tire system of claim 2, wherein the control unit further associates the plurality of tire monitors with left versus right position based on the count values.

4. The remote tire monitor system of claim 1, wherein the control unit is operable to store a distance between the detector and each tire monitor and associate the distance information with the count values.

5. The remote tire monitor system of claim 1, wherein the detector is positioned off-center and proximate either a front axle or a rear axle.

6. A remote tire monitor system for use with a vehicle having a front side, a rear side, a left side and a right side, comprising:
a plurality of tire monitors associated with each side of the vehicle and operable to transmit tire information;
a single radio frequency (RF) detector positioned proximate one side of the vehicle and generate a transmission indication in response to radio frequency (RF) transmissions from at least one of the plurality of tire monitors;
a central receiver operable to receive the tire information independently of the single RF detector; and
a control unit coupled with the RF detector and the receiver, the control unit operable to determine positions of the plurality of tire monitors based on the transmission indication from the single RF detector and the tire information from the receiver
wherein the single RF detector is arranged remote from the control unit and the central receiver is arranged proximate the control unit, and the single RF detector is arranged proximate one of a front tire set and a back tire set and one of a left tire set and a right tire set;
wherein the control unit is operable to evaluate a received signal strength for each transmission from the plurality of tire monitors and the control unit is operable to determine front versus rear position information based on the detected transmission indication and left versus right position information based on the received signal strength.

7. The remote tire monitor system of claim 6, wherein the detector is positioned proximate either the front side or the rear side and operable to detect RF transmissions from tire monitors proximate the detector.

8. The remote tire monitor system of claim 6, wherein the detector is positioned proximate either the left side or the right side and operable to detect RF transmissions from tire monitors proximate the detector.

9. The remote tire monitor system of claim 6, wherein the control unit is configured to detect a malfunctioning of the detector and determine front versus rear position information and left versus right position information based on the received signal strength upon detection of the malfunctioning.

10. A remote tire monitor system for use with a vehicle having a front side, a rear side, a left side and a right side, comprising:
a plurality of tire monitors associated with each side of the vehicle and operable to transmit tire information, each tire monitor including an acceleration sensor to detect acceleration values and generating an acceleration signal for the acceleration values;
a single radio frequency (RF) detector positioned proximate one side of the vehicle and generate a transmission indication in response to radio frequency (RF) transmissions from at least one of the plurality of tire monitors;
a receiver operable to receive the tire information; and
a control unit coupled with the RF detector and the receiver, the control unit operable to determine positions of the plurality of tire monitors based on the transmission indication and the tire information, the control unit also operable to evaluate the acceleration signal for each transmission from the plurality of tire monitors.

11. The remote tire system of claim 10, wherein the control unit is operable to determine front versus rear position information based on the transmission indication and left versus right position information based on a polarity of the acceleration signal.

12. The remote tire system of claim 10, wherein the control unit is operable to determine front versus rear position information based on the transmission indication and left versus right position information based on lead/lag relationship of the acceleration signal.

13. A tire monitor method for use with a vehicle having a front side, a rear side, a left side and a right side, the method comprising:
positioning a single radio frequency (RF) detector proximate one of a front tire set and a back tire set and one of a left tire set and a right tire set;
at the single RF detector, detecting RF transmissions from at least one of a plurality of tire monitors associated with each side of the vehicle;
at a central receiver, receiving tire data from the plurality of tire monitors independently of the detection of the RF transmissions at the single RF detector;
at a control unit, determining positions of the plurality of tire monitors based on the detected RF transmissions from the single RF detector and the tire data from the receiver, wherein determining positions comprises:

at the control unit, counting a number of detected transmissions from each tire monitor;

at the control unit, comparing the number of detected transmissions among the plurality of tire monitors;

selecting at least one identifier having a greater number of the detected transmissions than the rest of the tire monitors processing the received tire data to extract an identifier of each tire monitor; and associating the identifier with the number of detected transmission.

14. The tire monitor method of claim 13, further comprising:

assigning the selected identifier to at least one tire monitor proximate the single RF detector; and assigning the remaining identifiers to at least one tire monitor distal from the signal RF detector.

15. The tire monitor method of claim 13, wherein detecting transmissions comprises:

detecting the transmissions from tire monitors proximate the single RF detector; and detecting no transmissions from tire monitors distal from the single RF detector.

16. The tire monitor method of claim 15, further comprising:

selecting a first identifier associated with the detected transmissions;

selecting a second identifier associated with no transmissions;

assigning the first identifier to the tire monitors proximate the RF detector and assigning the second identifier to the tire monitors distal from the RF detector.

17. The tire monitor method of claim 16, further comprising:

at the control unit, determining a received signal strength from each tire monitor;

determining a left versus right position of the tire monitors proximate the front side based on the received signal strength; and determining the left versus right position of the tire monitors proximate the rear side based on the received signal strength.

18. The tire monitor method of claim 16, further comprising:

at the control unit, determining a received signal strength from each tire monitor;

determining a front versus rear position of the tire monitors proximate the left side based on the received signal strength; and determining the front versus rear position of the tire monitors proximate the right side based on the received signal strength.

19. The tire monitor method of claim 13, further comprising:

positioning the single detector to be off-center and proximate one of the front axle and the rear axle.

20. The tire monitor method of claim 19, further comprising:

at the control unit, comparing the number of detected transmissions among the plurality of tire monitors;

assigning the identifier having the greatest number of detected transmissions to a tire monitor proximate the single RE detector; and assigning the identifier having the smallest number of detected transmissions to a tire monitor distal from the signal RF detector.

21. A tire monitor method for use with a vehicle having a front side, a rear side, a left side and a right side, the method comprising:

at a plurality of tire monitors associated with each side of the vehicle, generating acceleration signals representing acceleration values that arise from rotation of wheels;

positioning a single radio frequency (RF) detector proximate one side of the vehicle;

at the single RF detector, detecting RF transmissions from at least one of the plurality of tire monitors;

at a receiver, receiving tire data from the plurality of tire monitors; and at a control unit, determining positions of the plurality of tire monitors based on the detected RF transmissions and the tire data by at least evaluating a polarity of the acceleration signals and determining a left versus right position of the tire monitors based on the polarity of the acceleration.

22. A tire monitor method for use with a vehicle having a front side, a rear side, a left side and a right side, the method comprising:

at a plurality of tire monitors associated with each side of the vehicle, generating acceleration signals representing acceleration values that arise from rotation of wheels;

positioning a single radio frequency (RF) detector proximate one side of the vehicle;

at the single RF detector, detecting RF transmissions from at least one of the plurality of tire monitors;

at a receiver, receiving lire data from the plurality of tire monitors; and at a control unit, determining positions of the plurality of tire monitors based on the detected RF transmissions and the tire data by at least evaluating a polarity of the acceleration signals and determining a front versus rear position of the tire monitors based on the polarity of the acceleration.

23. A tire monitor method for use with a vehicle having a front side, a rear side, a left side and a right side, the method comprising:

at a plurality of tire monitors associated with each side of the vehicle, generating acceleration signals representing acceleration values that arise from rotation of wheels;

positioning a single radio frequency (RF) detector proximate one side of the vehicle;

at the single RF detector, detecting RF transmissions from at least one of the plurality of tire monitors;

at a receiver, receiving tire data from the plurality of tire monitors; and at a control unit, determining positions of the plurality of tire monitors based on the detected RF transmissions and the tire data by at least evaluating lead/lag relationship of the acceleration signals; and determining a left versus right position of the tire monitors based on the lead/lag relationship of the acceleration.

24. A tire monitor method for use with a vehicle having a front side, a rear side, a left side and a right side, the method comprising:

at a plurality of tire monitors associated with each side of the vehicle, generating acceleration signals representing acceleration values that arise from rotation of wheels;

positioning a single radio frequency (RF) detector proximate one side of the vehicle;

at the single RF detector, detecting RF transmissions from at least one of the plurality of tire monitors;
at a receiver, receiving tire data from the plurality of tire monitors; and
at a control unit, determining positions of the plurality of tire monitors based on the detected RF transmissions and the tire data by at least evaluating lead/lag relationship of the acceleration signals and determining a front versus rear position of the tire monitors based on the lead/lag relationship of the acceleration.

* * * * *